United States Patent
Aoki

(10) Patent No.: US 9,013,271 B2
(45) Date of Patent: Apr. 21, 2015

(54) BIOMETRIC AUTHENTICATION APPARATUS AND METHOD

(75) Inventor: Takahiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 315 days.

(21) Appl. No.: 13/601,326

(22) Filed: Aug. 31, 2012

(65) Prior Publication Data
US 2012/0326841 A1    Dec. 27, 2012

Related U.S. Application Data

(63) Continuation of application No. PCT/JP2010/053806, filed on Mar. 8, 2010.

(51) Int. Cl.
*G05B 19/00* (2006.01)
*G06K 9/00* (2006.01)
*G06F 21/32* (2013.01)
*H04L 9/32* (2006.01)

(52) U.S. Cl.
CPC .......... *G06K 9/00087* (2013.01); *G06F 21/32* (2013.01); *H04L 9/3231* (2013.01); *G06K 9/00912* (2013.01); *G06K 9/00926* (2013.01)

(58) Field of Classification Search
CPC .......... G06K 2009/00932; G06K 9/00; G06K 9/00026; G06K 9/00885; G06K 9/00006; G06K 9/481; G06F 21/32; A61B 5/1172; G06T 2207/30101; H04L 63/0861
USPC ................. 340/5.82, 5.52, 5.53; 382/115, 126
See application file for complete search history.

(56) References Cited

U.S. PATENT DOCUMENTS

| | | | | |
|---|---|---|---|---|
| 5,067,162 | A   * | 11/1991 | Driscoll et al. | 382/126 |
| 7,526,110 | B2  * | 4/2009  | Niinuma et al.  | 382/125 |
| 2001/0036297 | A1 | 11/2001 | Ikegami et al. | |
| 2002/0133725 | A1 * | 9/2002 | Roy et al. | 713/202 |
| 2002/0176610 | A1 * | 11/2002 | Okazaki et al. | 382/118 |
| 2004/0057605 | A1 * | 3/2004 | Kono et al. | 382/115 |
| 2005/0185828 | A1 * | 8/2005 | Semba et al. | 382/124 |

(Continued)

FOREIGN PATENT DOCUMENTS

| | | | |
|---|---|---|---|
| EP | 2 009 596 A2 | 12/2008 | |
| EP | 2 009 596 A3 | 7/2009 | |

(Continued)

OTHER PUBLICATIONS

International Preliminary Report on Patentability mailed Sep. 20, 2012 (English translation mailed Oct. 11, 2012) in corresponding International Patent Application No. PCT/JP2010/053806.

(Continued)

*Primary Examiner* — Quang D Pham
(74) *Attorney, Agent, or Firm* — Staas & Halsey LLP

(57) ABSTRACT

A biometric authentication apparatus is provided, the apparatus including: a comparator that performs authentication of the user by comparing biological information read from a user with registered biological information registered in a storage in advance; a high accuracy comparator that compares the biological information with the registered biological information with a higher accuracy instead of comparison using the comparator when the user is not authenticated by the comparator; and a comparison result storage that records a comparison result obtained by the high accuracy comparator in the storage.

10 Claims, 34 Drawing Sheets

(56) References Cited

U.S. PATENT DOCUMENTS

| | | | | |
|---|---|---|---|---|
| 2006/0018523 | A1* | 1/2006 | Saitoh et al. | 382/124 |
| 2006/0165265 | A1 | 7/2006 | Fujimatsu | |
| 2007/0200925 | A1 | 8/2007 | Kim | |
| 2008/0037834 | A1* | 2/2008 | Abe | 382/115 |
| 2008/0063244 | A1* | 3/2008 | Tanaka et al. | 382/115 |
| 2008/0112597 | A1* | 5/2008 | Asano | 382/115 |
| 2008/0172725 | A1 | 7/2008 | Fujii et al. | |
| 2008/0181466 | A1* | 7/2008 | Iizuka et al. | 382/115 |
| 2009/0238418 | A1* | 9/2009 | Sato | 382/115 |
| 2010/0198078 | A1* | 8/2010 | Abe | 600/473 |
| 2010/0284575 | A1* | 11/2010 | Yoshimine et al. | 382/116 |
| 2012/0189170 | A1* | 7/2012 | Uno et al. | 382/115 |
| 2012/0230555 | A1* | 9/2012 | Miura et al. | 382/124 |
| 2012/0250954 | A1* | 10/2012 | Nada et al. | 382/124 |
| 2013/0114863 | A1* | 5/2013 | Kamata et al. | 382/115 |
| 2013/0194433 | A1* | 8/2013 | Yamamoto | 348/169 |

FOREIGN PATENT DOCUMENTS

| | | |
|---|---|---|
| EP | 2 009 596 B1 | 5/2010 |
| JP | 2-158841 | 6/1990 |
| JP | 2000-354247 | 12/2000 |
| JP | 2000354247 A * | 12/2000 |
| JP | 2001-307102 | 11/2001 |
| JP | 2003-323618 | 11/2003 |
| JP | 2004-110481 | 4/2004 |
| JP | 2004-318583 | 11/2004 |
| JP | 2005-71009 | 3/2005 |
| JP | 2006-85265 | 3/2006 |
| JP | 2006-309490 | 11/2006 |
| JP | 2007-140823 | 6/2007 |
| JP | 2007-215189 | 8/2007 |
| JP | 2007-257040 | 10/2007 |
| JP | 2008-176407 | 7/2008 |
| JP | 2008-191743 | 8/2008 |
| JP | 2008-310714 | 12/2008 |
| JP | 2009-9434 | 1/2009 |

OTHER PUBLICATIONS

Office Action mailed Sep. 10, 2013 in corresponding Japanese Application No. 2012-504181.

International Search Report of Corresponding PCT Application PCT/JP2010/053806 mailed Apr. 6, 2010.

* cited by examiner

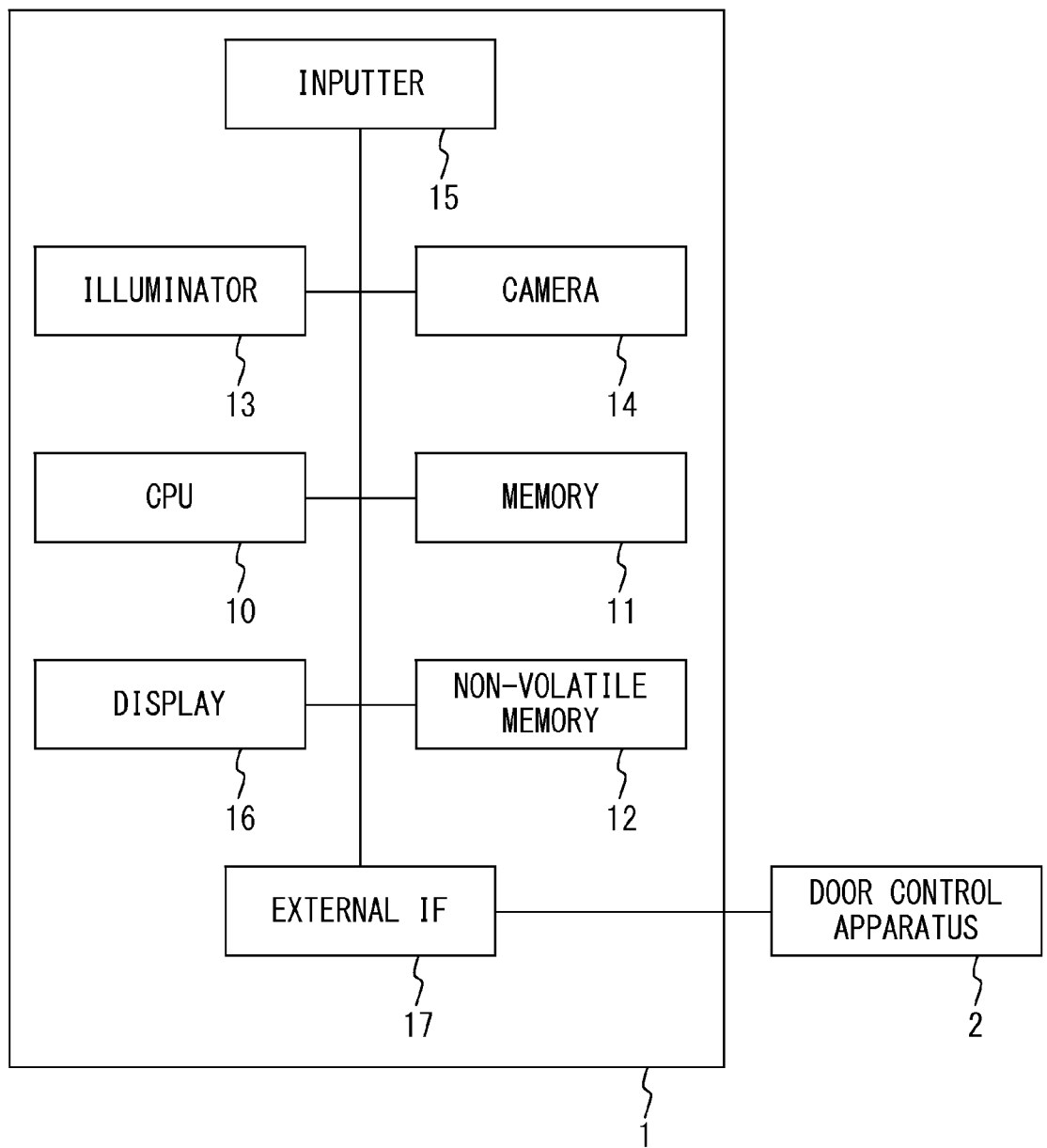
F I G. 1

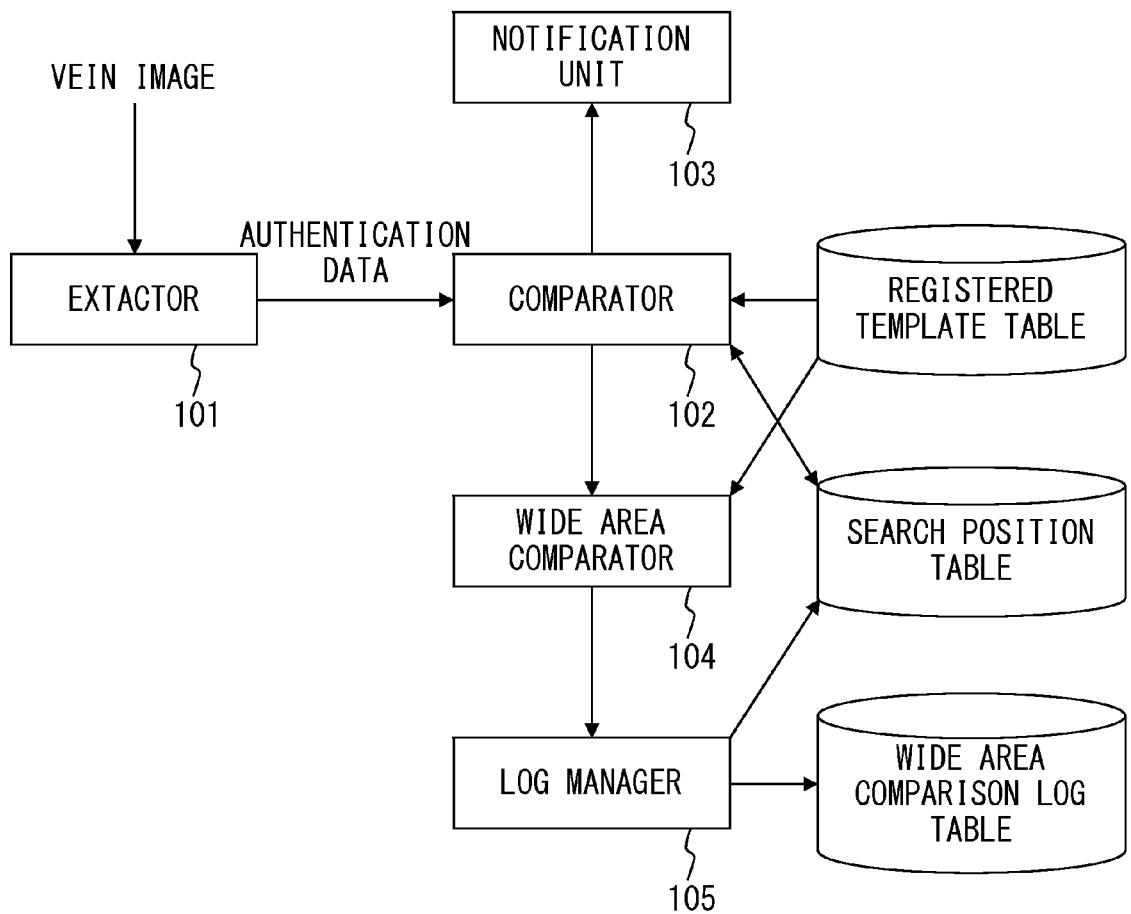
F I G. 2

| ID | REGISTERED TEMPLATE |
|---|---|
| 0001 | TEMPLATE 1 |
| 0002 | TEMPLATE 2 |
| 0003 | TEMPLATE 3 |
| ... | ... |

F I G. 3

| No | ID | AUTHENTICATION EXECUTION TIME | RESULT | POSTURE VARIATIONS |
|---|---|---|---|---|
| 1 | 0001 | 2009/07/09 7:01 | OK | Δ=(100, −3) |
| 2 | 0001 | 2009/07/09 7:02 | OK | Δ=(120, 5) |
| 3 | 0002 | 2009/07/09 7:25 | OK | Δ=() 20, −100 |
| 4 | 0003 | 2009/07/09 7:29 | NG | — |
| … | … | … | … | … |

F I G. 4

| ID | SEARCH POSITION (X0, Y0) |
|---|---|
| 0001 | (+100, 0) |
| 0002 | (0, 0) |
| 0003 | (0, 0) |
| ... | ... |

F I G. 5

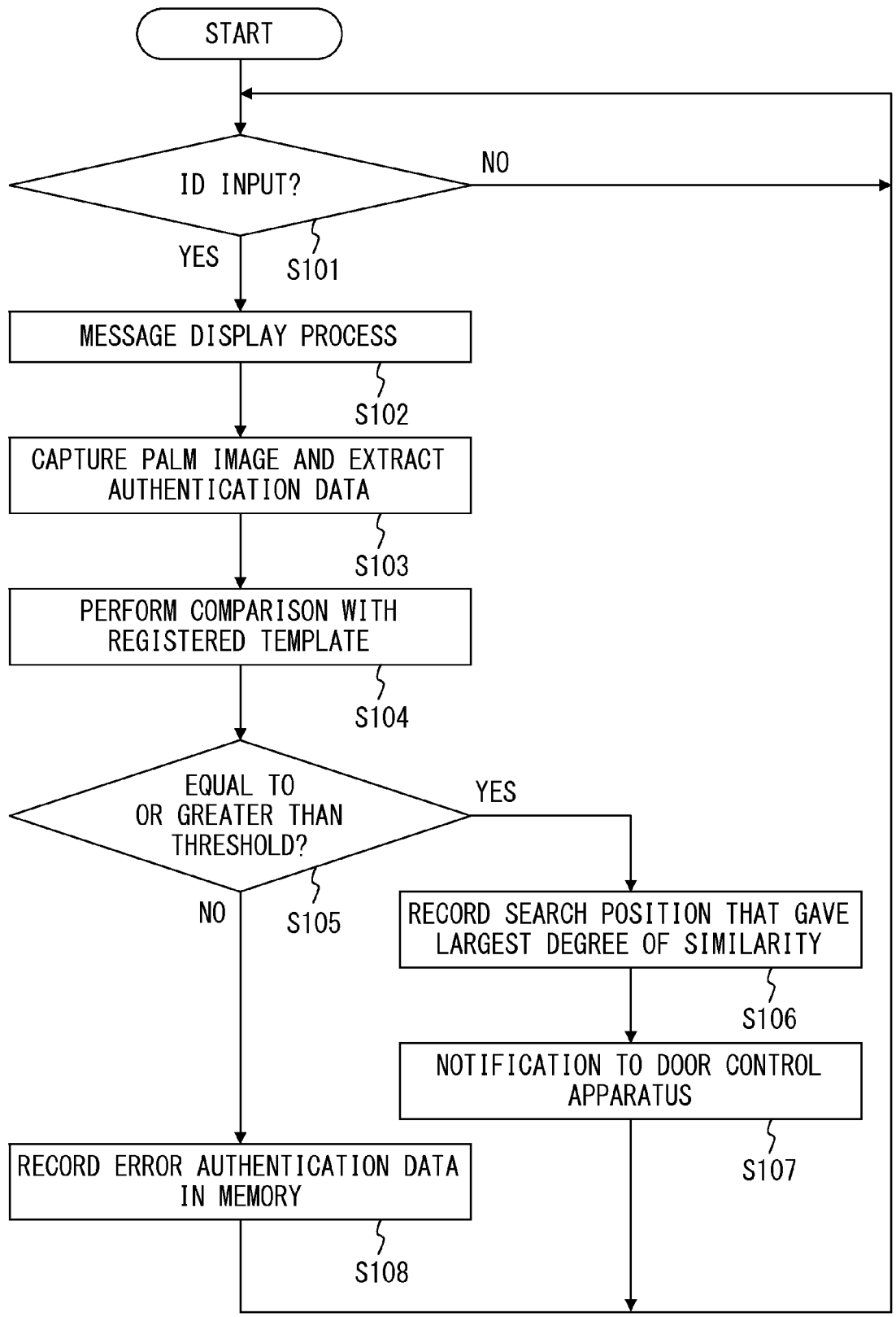
F I G. 6

| ID | AUTHENTICATION EXECUTION TIME | VALID PERIOD | AUTHENTICATION PROCESS INFORMATION (SEARCH AREA, LARGEST DEGREE OF SIMILARITY, POSITION) |
| --- | --- | --- | --- |

F I G. 7

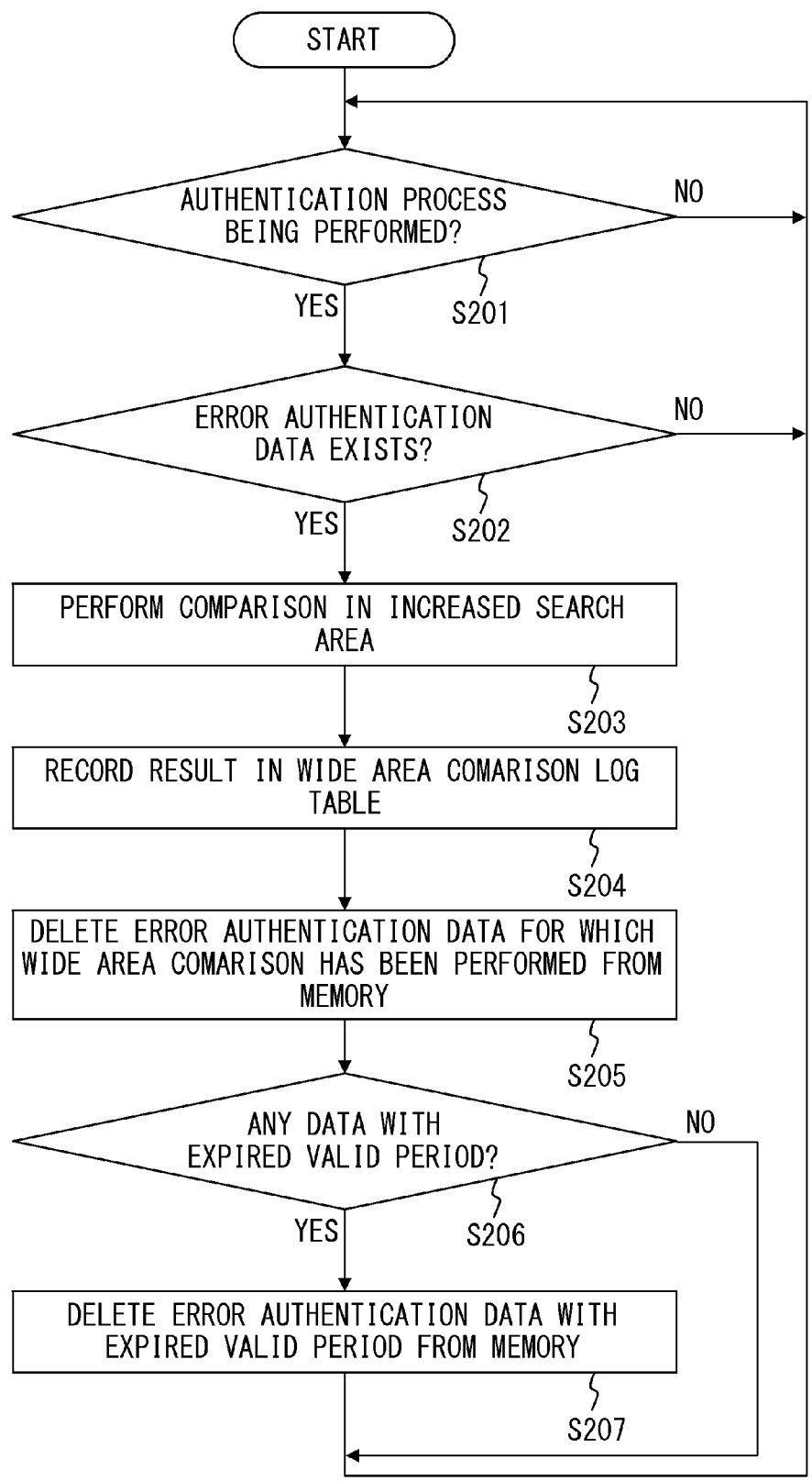
F I G. 8

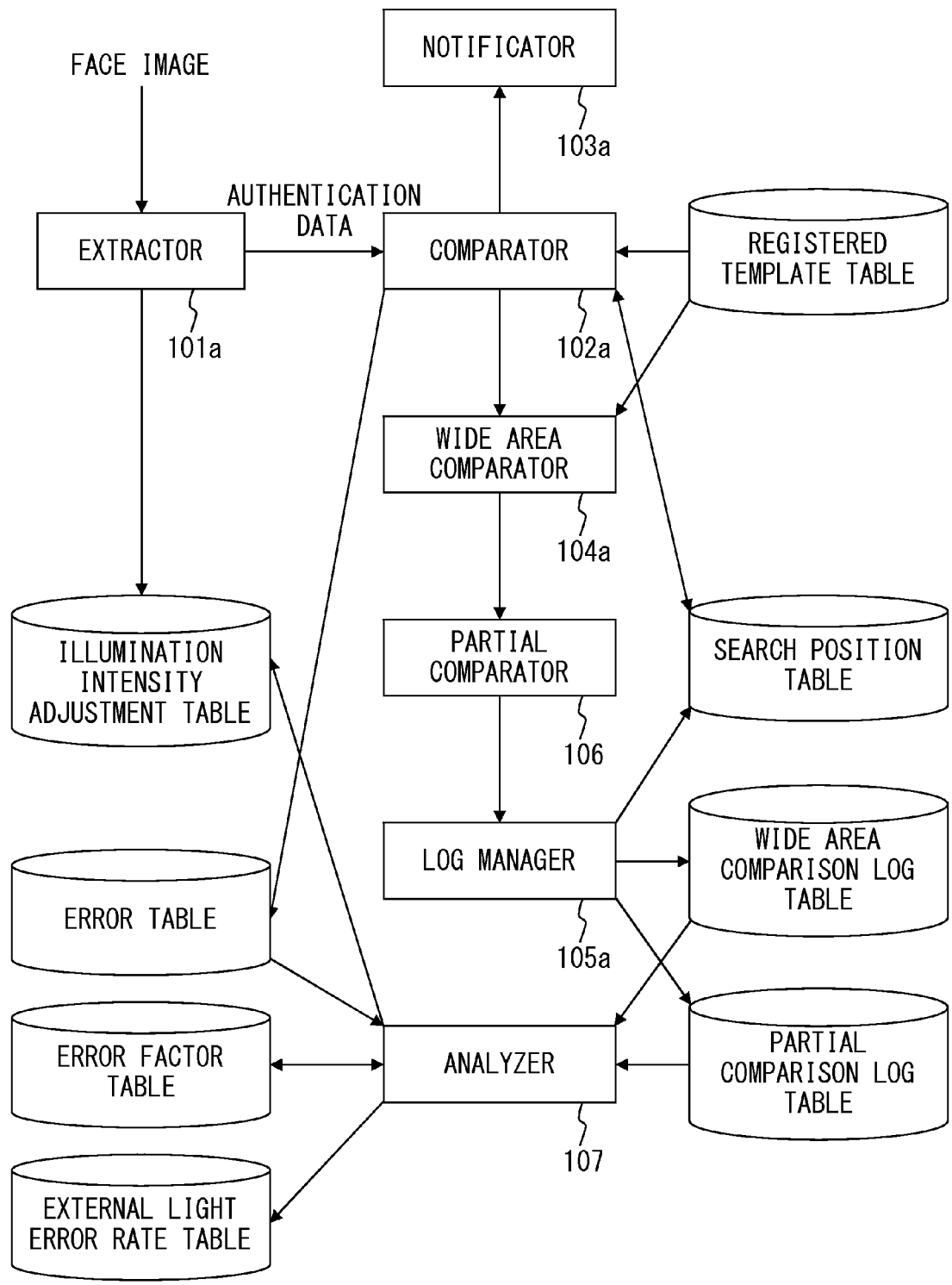
F I G. 1 3

| No | ID | AUTHENTICATION EXECUTION TIME | RESULT | COMPARISON BLOCK | EXTERNAL LIGHT DIRECTION |
|---|---|---|---|---|---|
| 1 | 0001 | 2009/07/09 01:15 | NG | — | — |
| 2 | 0001 | 2009/07/09 01:17 | NG | — | — |
| 3 | 0002 | 2009/07/09 01:45 | OK | a | 110° |
| 4 | 0003 | 2009/07/09 01:55 | OK | a | 102° |
| ... | ... | ... | ... | ... | ... |

FIG. 14

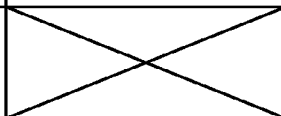
F I G. 1 5

| ID / PERIOD OF TIME | 0001 | 0002 | 0003 | ERROR FACTOR IN EACH PERIOD OF TIME |
|---|---|---|---|---|
| 00:00-01:00 | — | — | — | 0 |
| 01:00-02:00 | UNKNOWN、POSTURE | EXTERNAL LIGHT | EXTERNAL LIGHT | POSTURE × 1、EXTERNAL LIGHT × 2、UNKNOWN × 1 |
| 02:00-03:00 | — | — | — | — |
| 04:00-05:00 | POSTURE、POSTURE | — | — | POSTURE × 2 |
| 05:00-06:00 | POSTURE | — | — | POSTURE × 1 |
| 06:00-07:00 | POSTURE | — | — | POSTURE × 1 |
| ... | ... | ... | ... | ... |
| ERROR FACTOR FOR EACH USER | POSTURE × 5 UNKNOWN × 1 | EXTERNAL LIGHT × 1 | EXTERNAL LIGHT × 1 | ✗ |

FIG. 16

| PERIOD OF TIME | DUTY RATIO |
|---|---|
| 00:00-01:00 | 50% |
| 01:00-02:00 | 70% |
| 02:00-03:00 | 50% |
| 04:00-05:00 | 50% |
| 05:00-06:00 | 50% |
| 06:00-07:00 | 50% |
| ... | ... |

F I G. 1 7

| PERIOD OF TIME | NUMBER OF EXTERNAL LIGHT ERRORS | TOTAL NUMBER OF COMPARISONS | ERROR RATE DUE TO EXTERNAL LIGHT | EXTERNAL LIGHT DIRECTION |
|---|---|---|---|---|
| 00:00-01:00 | 0 | 0 | 0.0% | — |
| 01:00-02:00 | 2 | 7 | 28.6% | 106° |
| 02:00-03:00 | 0 | 1 | 0.0% | — |
| 04:00-05:00 | 0 | 4 | 0.0% | — |
| 05:00-06:00 | 0 | 2 | 0.0% | — |
| 06:00-07:00 | 0 | — | 0.0% | — |
| ... | ... | ... | ... | ... |

FIG. 18

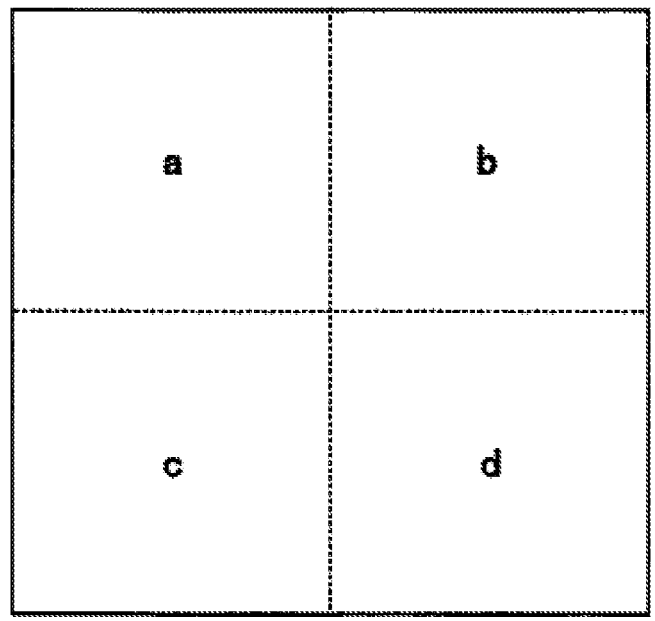
F I G. 2 1

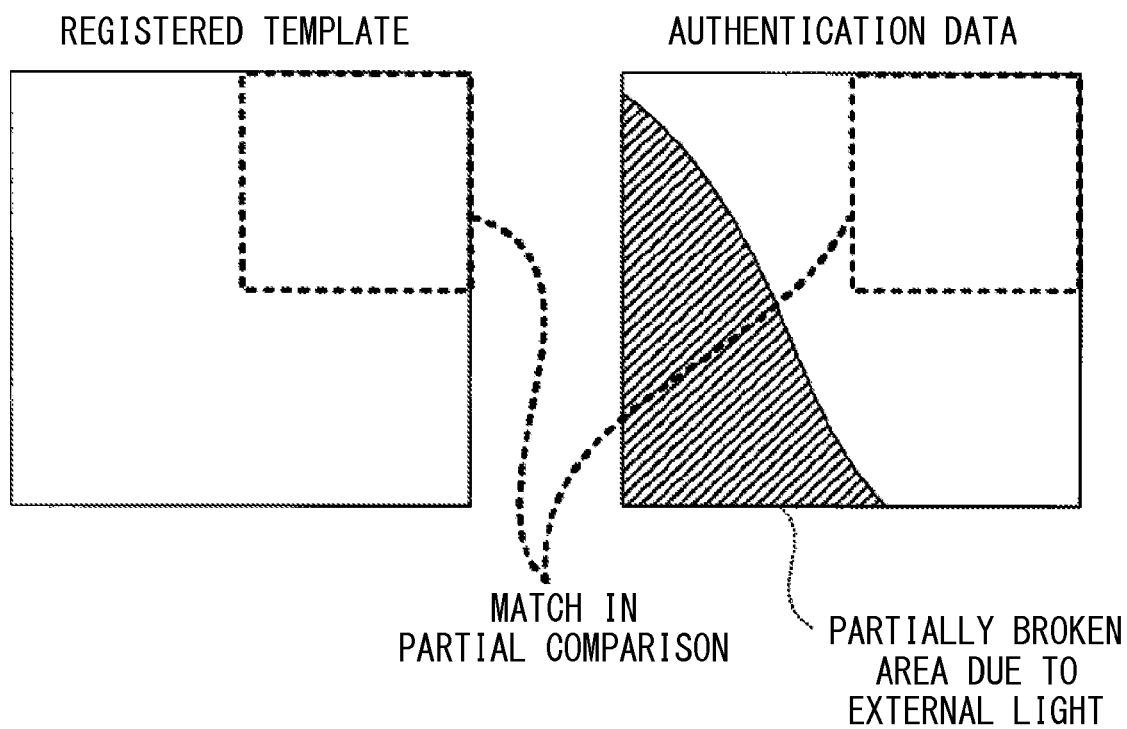
F I G. 2 2

$$\vec{A} = \sum_i \left(\frac{1}{w_i}\right) \vec{a}_i$$

FIG. 23

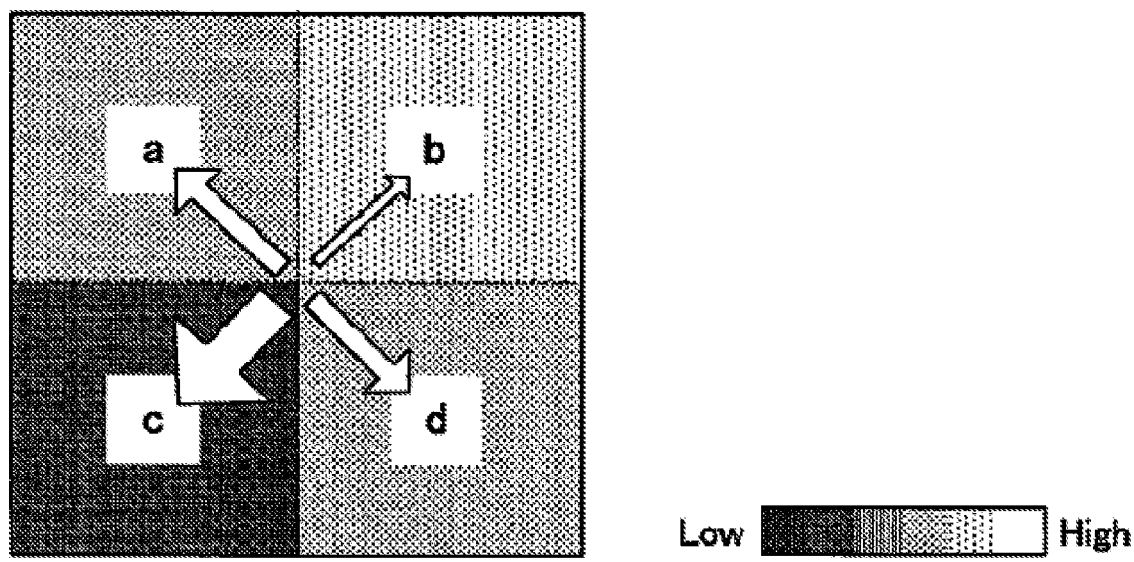
F I G. 2 4

$$e_{ErrL}(t) = \frac{C_{ErrL}(t)}{C(t)}$$

FIG. 27

$$<\vec{A}> \equiv \frac{1}{C_{ErrL}(t)} \sum_{i=1}^{C_{ErrL}(t)} \vec{A}_i$$

F I G. 2 8

$$e'_{ErrL}(t) = \frac{N_{ErrL}(t)}{N(t)}$$

FIG. 29

| DATA | NUMBER OF EXTERNAL LIGHT ERRORS | TOTAL NUMBER OF COMPARISONS | ERROR RATE DUE TO EXTERNAL LIGHT | EXTERNAL LIGHT DIRECTION |
|---|---|---|---|---|
| 11/01 | 0 | 0 | 0.0% | — |
| 11/02 | 2 | 7 | 0.0% | — |
| 11/03 | 0 | 1 | 0.0% | — |
| 11/04 | 0 | 4 | 0.0% | — |
| 11/05 | 0 | 2 | 50.0% | 106° |
| ... | ... | ... | ... | ... |

F I G. 3 0

$$e_A = \sum_{t=0}^{t=23} \frac{C_{ErrA}(t)}{C(t)}$$

F I G. 3 1

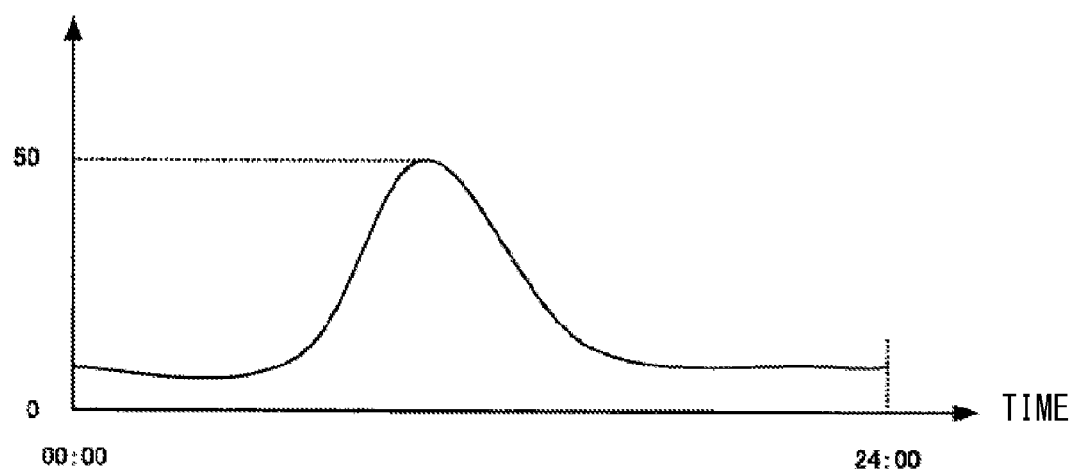
F I G. 3 2

$$e^*_{AL}(t) = \frac{(C_{Err}(t) - C_{ErrA}(t) - C_{ErrL}(t))}{C(t)}$$

FIG. 33

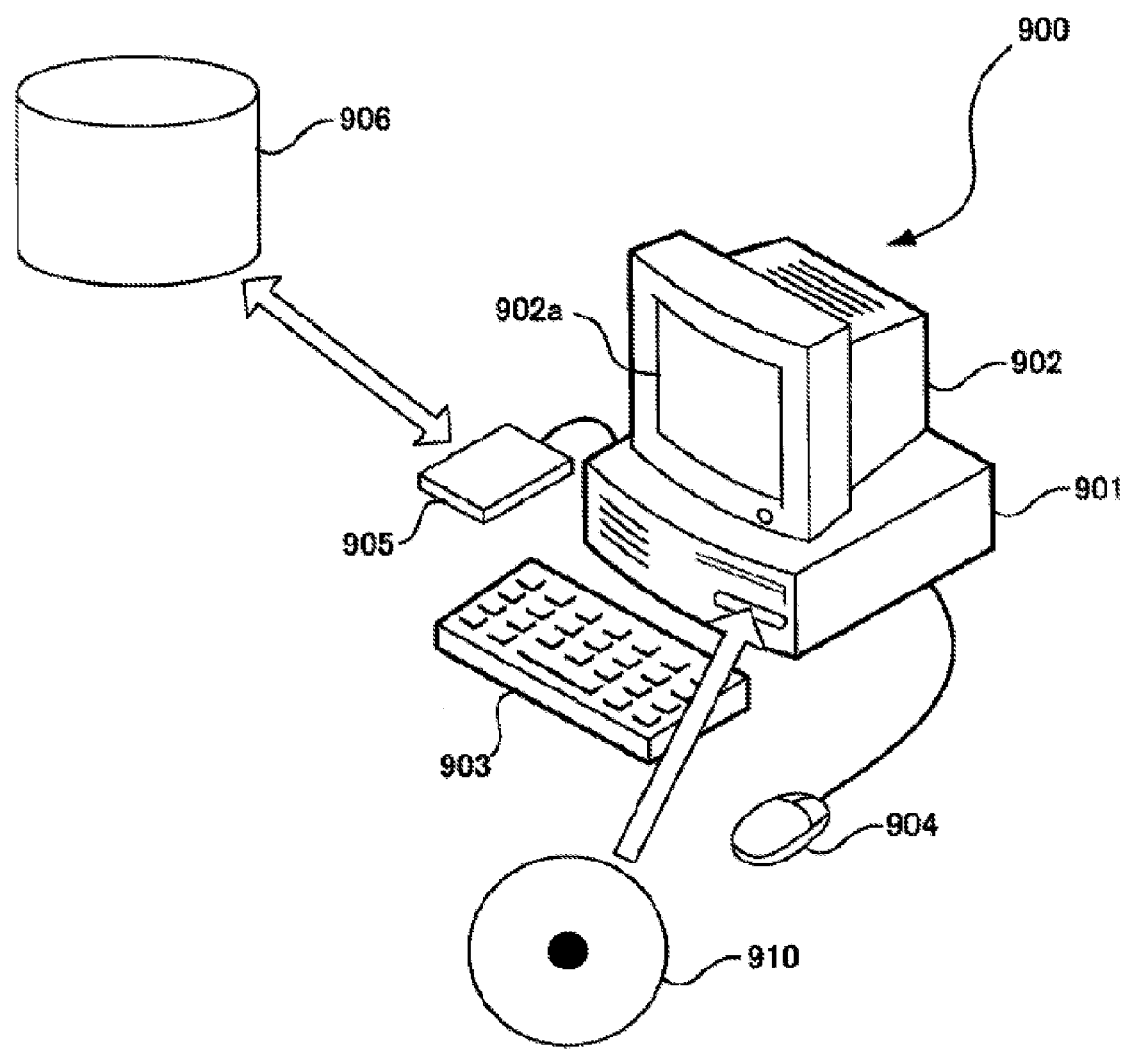
F I G. 34

BIOMETRIC AUTHENTICATION APPARATUS AND METHOD

CROSS-REFERENCE TO RELATED APPLICATION

This application is a continuation application of International Application PCT/JP2010/053806 filed on Mar. 8, 2010 and designated the U.S., the entire contents of which are incorporated herein by reference.

FIELD

The present invention relates to a biometric authentication apparatus, a biometric authentication program and method.

BACKGROUND

Biometric authentication has been known as a technique to identify an individual person based on biological characteristics which is possessed by a human being, such as the vein pattern, the face pattern and the like. In the biometric authentication, first, data representing the biological characteristics of an authentication target is registered as a registered template, and the subject person is identified by comparing authentication data representing characteristics of the biological pattern of an individual person obtained by a sensor such as a camera with the registered template in the authentication. Specifically, the degree of similarity between the authentication data and the registered template is calculated, and when the degree of similarity exceeds a predetermined threshold, the authentication target is determined as the subject person. In such biometric authentication, the authentication errors occur at a certain rate. As one of the authentication errors, there is a false rejection error by which, even though a characteristic data indicates the subject person, identity verification may fail due to a low degree of similarity of the characteristic data with the registered template.

There are mainly two possible reasons for the authentication errors described above. One reason is ascribed to the posture mismatch of the authentication part with the direction of the sensor used to the authentication. Since the subject of the authentication is a human being, the authentication part is not necessarily captured by the sensor when a posture of the authentication part matches with the posture in the registered template. Another reason is ascribed to an external light on the biometric authentication apparatus. The biometric authentication using an image is sometimes affected by the sunlight from outside, indoor incandescent lights and the like. While many of the authentication apparatuses illuminate the subject using a light source provided for themselves and capture the image, when the amount of unintended light from the sunlight and incandescent lights has a large influence on the image, these external lights cause an authentication error.

However, since it is difficult to save authentication data including data of the face and veins of a person to be authenticated as a log due to security and privacy issues, it is difficult for the administrator of the biometric authentication apparatus to investigate the cause of the occurrence of an authentication error.

SUMMARY

According to an aspect of the embodiment, a biometric authentication apparatus includes a comparator that performs authentication of the user by comparing biological information read from a user with registered biological information registered in a storage in advance; a high accuracy comparator that compares the biological information and the registered biological information with a higher accuracy than the comparison by the comparator when the user is not authenticated by the comparator; and a comparison result storage that records a comparison result obtained by the high accuracy comparator in the storage.

The object and advantages of the invention will be realized and attained by means of the elements and combinations particularly pointed out in the claims.

It is to be understood that both the foregoing general description and the following detailed description are exemplary and explanatory and are not restricted of the invention, as claimed.

BRIEF DESCRIPTION OF DRAWINGS

FIG. 1 is a diagram illustrating the hardware configuration of a biometric authentication apparatus according to embodiment 1.

FIG. 2 is a diagram illustrating the functional configuration of the biometric authentication apparatus according to embodiment 1.

FIG. 3 is a diagram illustrating a registered template table.

FIG. 4 is a diagram illustrating a wide area comparison log table.

FIG. 5 is a diagram illustrating the search position table.

FIG. 6 is a diagram illustrating operations of an authentication process in embodiment 1.

FIG. 7 is a diagram illustrating information attached to error authentication data.

FIG. 8 is a diagram illustrating operations of a wide area comparison process.

FIG. 13 is a diagram illustrating the functional configuration of the biometric authentication apparatus according to embodiment 2.

FIG. 14 is a diagram illustrating a partial comparison log table.

FIG. 15 is a diagram illustrating an error table.

FIG. 16 is a diagram illustrating an error factor table.

FIG. 17 is a diagram illustrating an illumination intensity table.

FIG. 18 is a diagram illustrating an external light error rate table.

FIG. 21 is a diagram illustrating blocks divided in the partial comparison.

FIG. 22 is a diagram illustrating an effect of the partial comparison.

FIG. 23 is a diagram illustrating the formula for obtaining the external light direction.

FIG. 24 is a diagram schematically illustrating a method for obtaining the external light direction.

FIG. 27 is a diagram illustrating the formula for calculating an error rate due to external light.

FIG. 28 is a diagram illustrating the formula for calculating the average vector of the external light directions.

FIG. 29 is a diagram illustrating the formula for calculating an external error generating user rate.

FIG. 30 is a diagram illustrating a history table.

FIG. 31 is a diagram illustrating an error rate due to posture mismatch.

FIG. 32 is a diagram illustrating the change in the error rate due to external light.

FIG. 33 is a diagram illustrating the formula for calculating a cause unknown error rate.

FIG. 34 is a diagram illustrating an example of a computer system.

DESCRIPTION OF EMBODIMENTS

Figure 9:
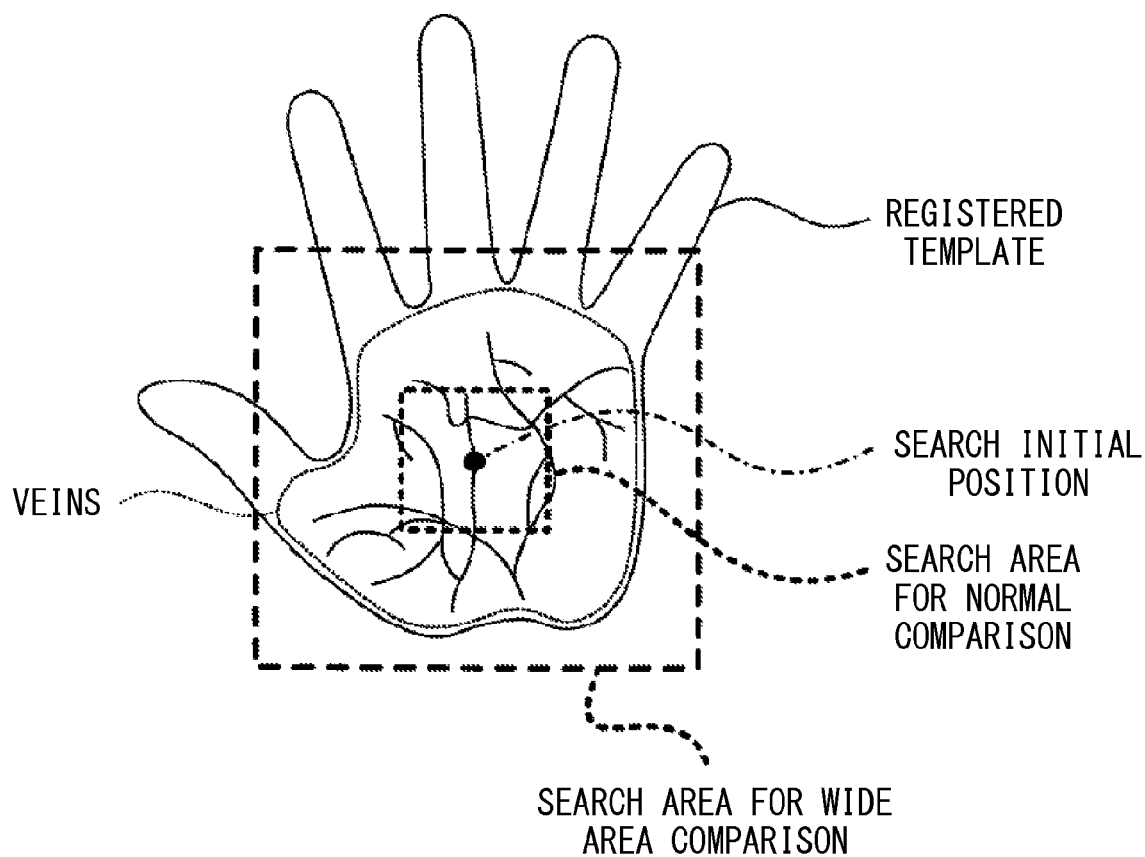
FIG. 9 is a diagram illustrating a search area.

Hereinafter, embodiments of the present invention are explained referring to the drawings.

In the embodiments of the present invention, the cause of the occurrence of an authentication error can be investigated without saving authentication data as a log.

Embodiment 1

First, the hardware configuration of a biometric authentication apparatus according to an embodiment 1 is explained. FIG. 1 is a diagram illustrating the hardware configuration of a biometric authentication apparatus according to the embodiment 1.

The biometric authentication apparatus 1 according to the embodiment 1 is connected to a door control apparatus 2, and performs palm vein authentication. In the palm vein authentication, the identity check is performed by comparing a registered template that is the vein pattern of a palm registered in advance with authentication data that is based on a captured vein image. As illustrated in FIG. 1, the biometric authentication apparatus 1 has a CPU (Central Processing Unit) 10, a memory 11, a non-volatile memory 12, an illuminator 13, a camera 14, an inputter 15, a display 16, an external IF (Interface) 17 as hardware. The CPU 10 controls the biometric authentication apparatus 1. The memory 11 is a main memory to which the CPU 10 accesses directly. The non-volatile memory 12 stores a registered template table, a wide area comparison log table and a search position table described later. As the non-volatile memory 12, a hard disc, a flash memory, and the like may be available. The illuminator 13 emits near-infrared rays to the palm being a target whose image to be captured by the camera 14. As the illuminator 13, a LED and the like may be available. The camera 14 receives the near-infrared rays that is emitted from the illuminator 13 and is reflected from the palm to capture an image of the palm vein. As the camera 14, a CMOS (Complementary Metal Oxide Semiconductor) image sensor, and a CCD (Charge Coupled Device) may be available. The inputter 15 is a device by which the user of the biometric authentication apparatus 1 inputs the ID. As the inputter 15, a numerical keypad, a keyboard, a touch panel to input the ID, or a scanning device of a non-contact IC card on which the ID is recorded may be available. The display 16 presents information to the user of the biometric authentication apparatus 1. The external IF 17 intermediates the transmission/reception of information between the 17 the biometric authentication apparatus 1 the door controller 2.

Figure 3:
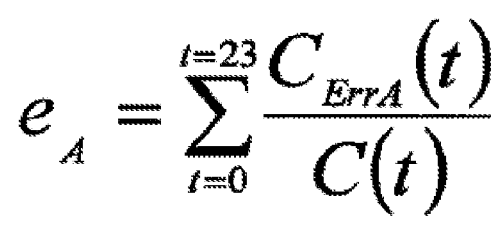

Next, the functional configuration of the biometric authentication apparatus according to the embodiment 1 is explained. FIG. 2 is a diagram illustrating the functional configuration of the biometric authentication apparatus according to the embodiment 1. Meanwhile, FIG. 3 is a diagram illustrating the registered template table. Meanwhile, FIG. 4 is a diagram illustrating a wide area comparison log table. FIG. 5 is a diagram illustrating a search position table.

As illustrated in FIG. 2, the biometric authentication apparatus 1 has an extractor 101, a comparator 102 (comparing unit, presentation unit), a notification unit 103, a wide area comparator 104 (high accuracy comparing unit), a log manager 105 (comparison result storage unit) as the functions. The extractor 101 extracts, from a vein image captured by the camera 14, a vein pattern being the biological characteristic used for the biometric authentication as the authentication data. The comparator 102 refers to the registered template table, and performs the identity check by comparing the registered template and the authentication data. The registered template associates and stores, as illustrated in FIG. 3, the ID indicating the individual user and the registered template corresponding to the ID. The comparator 102 performs, specifically, in the registered template table, a comparison process of the characteristics in the registered template corresponding to the ID input by the inputter 15 and in the authentication data is performed, the degree of similarity indicating the degree of identity between them is calculated, and when the degree of similarity is equal to or above a threshold, it is determined that the user being the authentication target is the subject person. In addition, the comparator 102 calculates the largest degree of similarity while applying operations such as parallel shift, rotation, contraction and enlargement on a search area specified in advance, and records the search position at which the largest degree of similarity is obtained while associating it with the ID, in the search position table illustrated in FIG. 5. Here, the search area represents the moving area of the authentication data, and the search position represents the moved position of the authentication data. The notificator 103 sends notification of an instruction for opening a door to the door control apparatus 2 only when the identity check by the comparator 102 is successful. The wide area comparator 104 performs the wide area comparison described above, to the authentication with which the identify check by the comparator 102 failed. The log manager 105 records the comparison result by the wide area comparator 104 in the wide area comparison log table. The wide area comparison log table records, as illustrated in FIG. 4, associates and stores the log number (No), ID, authentication execution time, comparison result, posture movement. Here, the posture movement indicates a position moved with respect to a reference position of the authentication data with which the degree of similarity is equal to or above the threshold in the wide area comparison.

Next, the authentication process in embodiment 1 is explained. FIG. 6 is a diagram illustrating the operation of an authentication process in embodiment 1. FIG. 7 is a diagram illustrating information attached to error authentication data.

As illustrated in FIG. 6, first, the extractor 101 determines whether or not an ID has been input to the inputter 15 (S101).

When the ID has been input to the inputter 15 (S101, YES), the comparator 102 executes a message displaying process described later (S102). Next, the extractor 101 causes the camera 14 to capture a vein image, and extracts authentication data from the captured image (S103). Next, the comparator 102 executes a comparison of the registered template corresponding to the input ID with the registered template table (S104), and determines whether the degree of similarity is above a threshold (S105). Meanwhile, in the search position table, when the search position corresponding to the ID exists, it is assumed that the search area of the authentication data in the comparison is based on the search position. In addition, when the search position corresponding to the ID does not exist in the search position table, it is assumed that the search area of the search data in the comparison is an area set in advance.

When the degree of similarity is equal or greater than a threshold in step S105 (S105, YES), the comparator 102 records the search position that gave the largest degree of similarity in the search position table (S106). In addition, the notificator 103 sends notification of an instruction for opening the door to the door control apparatus 2 (S107). After the notification, the extractor 101 determines whether or not an ID has been input to the inputter 15 again (S101).

On the other hand, when the degree of similarity is less than the threshold (S105, NO), the comparator 102 records the authentication data as error authentication data, in the memory 11. There, the comparator attaches information illustrated in FIG. 7 to the authentication data. The error authentication data includes the authentication data, ID, the authentication execution time, the valid period, the authentication process information. Here, the valid period indicates a term to record the error authentication data in the memory 11. In addition, the authentication process information includes the search area indicating an area searched in the comparison, the largest degree of similarity, and the coordinate position of the authentication at which the degree of similarity becomes largest. After recording the error authentication data, the extractor 101 determines whether an ID has been input to the inputter 15 again (S101).

Figure 10:
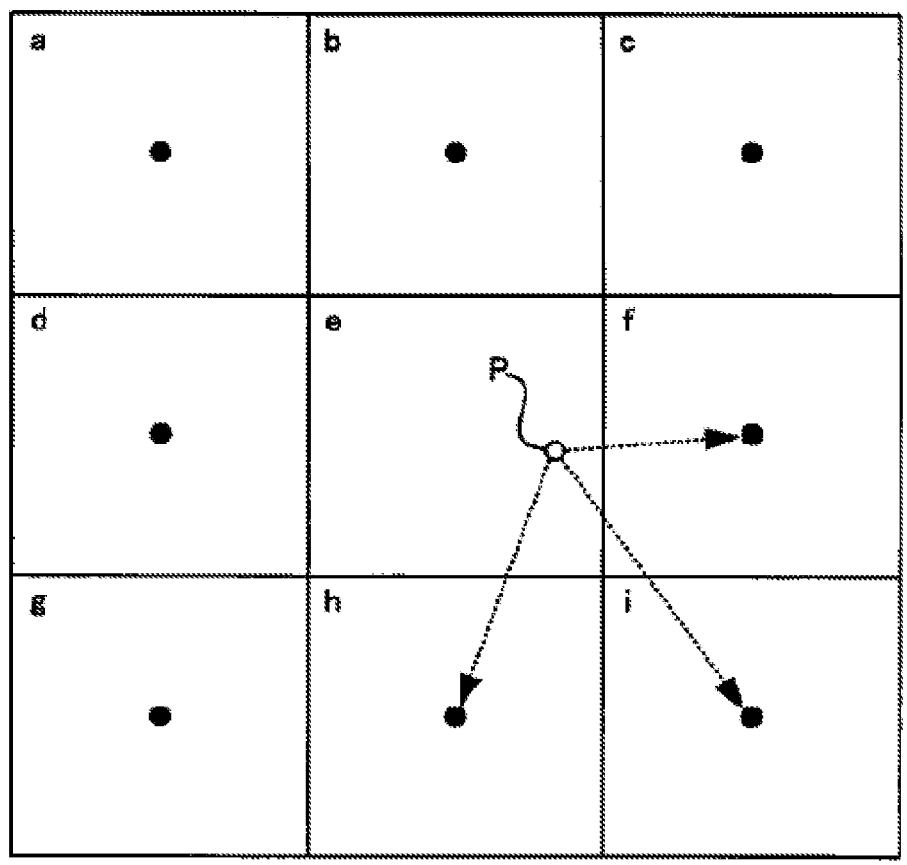
FIG. 10 is a diagram illustrating the degree of priority of the search area.

Next, the operation of a wide area comparison process is explained. FIG. 8 is a diagram illustrating operations of a wide area comparison process. Meanwhile, FIG. 9 is a diagram illustrating the search area. Meanwhile, FIG. 10 is a diagram illustrating the degree of priority of the search area.

As illustrated in FIG. 8, first, the wide area comparator 104 determines whether the authentication process is being performed (S201).

When the authentication process is not being performed (S201, NO), the wide area comparator 104 determines whether error authentication data exists in the memory 11 (S202).

When error authentication data exists in the memory 11 (S202, YES), the wide area comparator 104 conducts the comparison while increasing the search area beyond that in the comparison in the authentication process, as illustrated in FIG. 9 (S203). At this process, the wide area comparator 104 refers to the authentication process information attached to the authentication data, and excludes the area for which the comparison has already been performed in the authentication process from the search in the wide area comparison. In addition, the wide area comparator 104 divides the search area into a plurality of blocks as illustrated in FIG. 10, calculates the distance from a point P at which the degree of similarity in the authentication process is largest to the central point of each block, and expands the search area while giving a higher priority to the block as the distance is smaller. In FIG. 10, the search area is expanded in the order of f, h, i. As described above, the wide area comparison may be performed efficiently by expanding the search area from around the point at which the degree of similarity is the largest.

Next, the log manager 105 records the result of the wide area comparison over the expanded search area into the wide area comparison log table with the posture mismatch (S204). Here, when the degree of similarity in the wide area comparison is equal to or greater than a threshold, the log manager 105 records or updates the ID and the corresponding search position in the search position table at the coordinate position at which the degree of similarity becomes largest.

Next, the log manager 105 deletes the error authentication data for which the wide area comparison has been performed from the memory 11 (S205), and determines whether error authentication data whose valid period has expired exists in the memory 11 (S206).

When error authentication data whose valid period has expired exists in the memory 11 (S206, YES), the log manager 105 deletes the error authentication data whose valid period has expired from the memory 11 (S207). Next, the wide area comparator 104 determines whether the authentication process is being performed again (S201).

On the other hand, when error authentication data whose valid period has expired does not exist in the memory 11 (S206, NO), the wide area comparator 104 determines whether the authentication process is being performed again (S201).

Meanwhile, when there is no error authentication data in the memory 11 (S202, NO), the wide area comparator 104 determines whether the authentication process is being performed again (S201).

Meanwhile, when the authentication process is being performed in step S201 (S201, YES), the wide area comparator 104 determines whether the authentication process is being performed again (S201).

Thus, the biometric authentication apparatus 1 according to embodiment 1 performs the wide area comparison for the error authentication data, and records its result and the posture mismatch as a log. Accordingly, the administrator of the biometric authentication apparatus 1 may investigate the cause of occurrence of the authentication error without retaining authentication data having a problem in security or privacy beyond the valid period.

Figure 11:
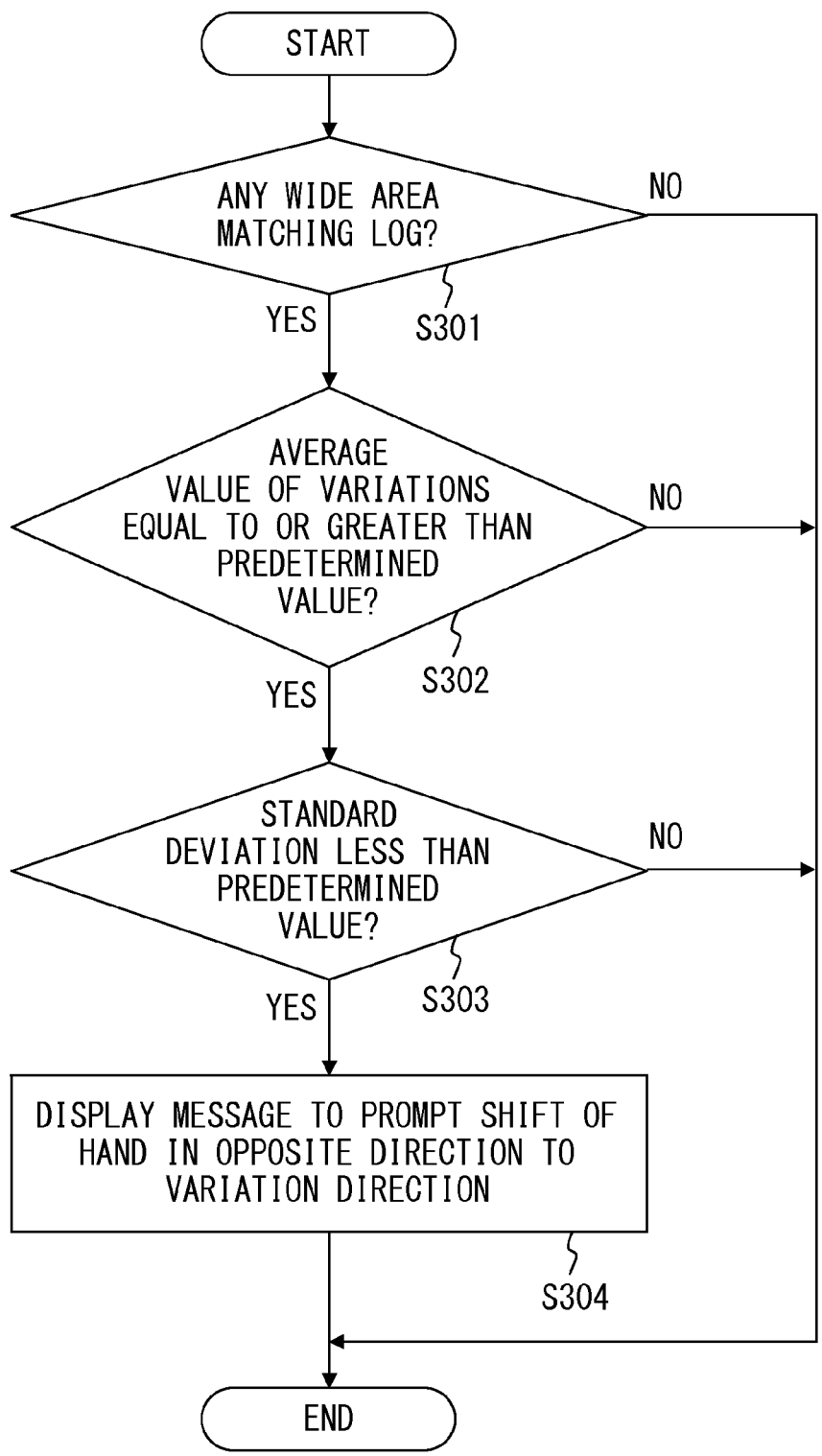
FIG. 11 is a diagram illustrating operations of a message display process.
Figure 12:
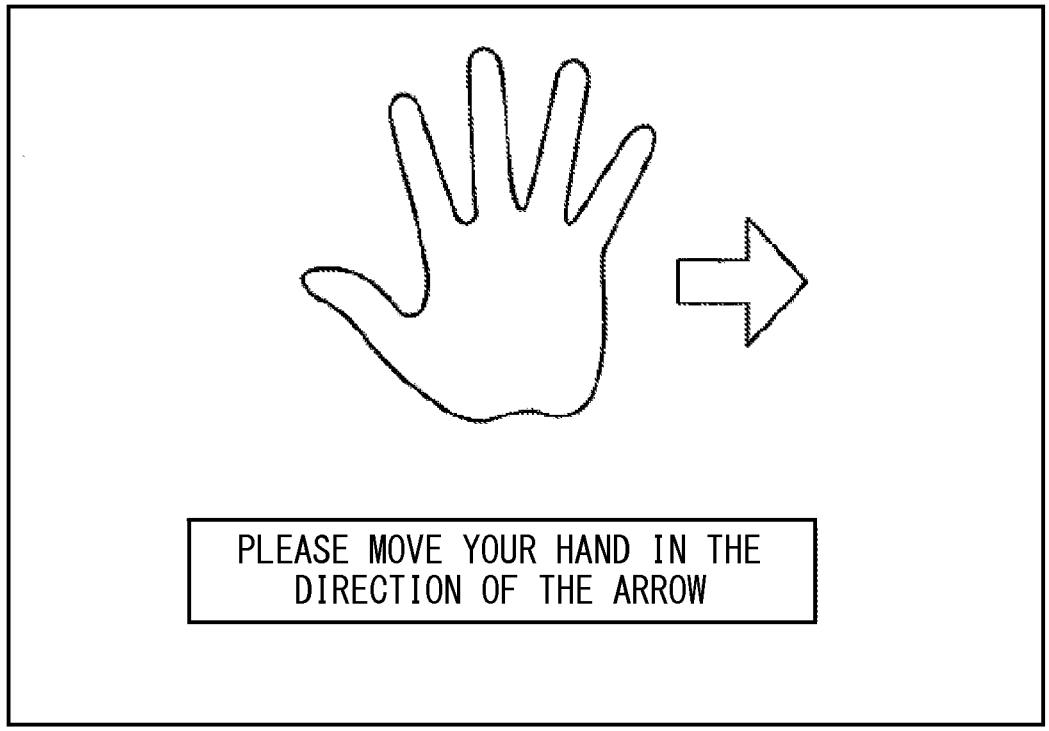
FIG. 12 is a diagram illustrating a message presented on a display.

Next, the operation of a message display process is explained. FIG. 11 is a diagram illustrating operations of a message display process. Meanwhile, FIG. 12 is a diagram illustrating a message presented on a display.

As illustrated in FIG. 11, first, the comparator 102 determines whether a wide area comparison log table corresponding to the input ID exists (S301).

If a wide area comparison log table corresponding to the input ID exists (S301, YES), the comparator 102 determines whether the average of the posture variations in the wide area comparison log table corresponding to the ID is equal to or greater than a predetermined value (S302).

When the average of the posture variations in the wide area comparison log table corresponding to the ID is equal to or greater than a predetermined value (S302, YES), the comparator 102 determines whether the standard deviation of the posture variations corresponding to the ID is less than a predetermined value (S303). According to this determination, whether the posture variations of the user indicated by the ID have a certain trend.

When the standard deviation of the posture variations corresponding to the ID is less than a predetermined value, as illustrated in FIG. 12, the comparator causes the display 16 to display a message for prompting the shift of the hand in the opposite direction to the posture variation direction (S304). Meanwhile, the shift of the hand of the user may be presented in any way. For example, the user may be prompted to shift the hand by voice. In addition, if the amount of the posture variation exceeds a predetermined range, the user may be prompted to reregister the registered template. The prompt of the reregistration of the registered template may be sent to the administrator and the like of the biometric authentication apparatus 1 via a connected network.

Thus, by presenting a message to the user based on the posture variations in the wide area comparison log table, the authentication error caused by the mismatch of the hand position in the authentication may be reduced.

Embodiment 2

In the embodiment 1 described above, the biometric authentication apparatus performs palm vein authentication, while in embodiment 2, the biometric authentication apparatus performs face authentication as the biometric authentication. Hereinafter, the biometric authentication apparatus according to the embodiment 2 is explained.

First, regarding the hardware configuration of the biometric authentication apparatus 1 according to the embodiment 2, the difference from the embodiment 1 is explained. The biometric authentication apparatus 1 according to the embodiment 2 is connected to the door control apparatus 2 and performs face authentication. In the face authentication, the identity check is performed by comparing a pattern (registered template) representing the characteristics of a face registered in advance and authentication data based on a face image captured. The non-volatile memory 12 stores the registered template table, the wide area comparison log table, the search position table, as well as a partial comparison log table, an illumination intensity adjustment table, a user-specific external error table, an error factor table, and an external light error rate table. The illuminator 13 radiates white light toward the face of the user being the image capturing target of the camera 14. The camera 14 captures the image of the face irradiated with white light radiated by the illuminator 13.

Next, the functional configuration of the biometric authentication apparatus 1 according to the embodiment 2 is explained. FIG. 13 is a diagram illustrating the functional configuration of the biometric authentication apparatus 1 according to the embodiment 2. Meanwhile, FIG. 14 is a diagram illustrating a partial comparison log table. Meanwhile, FIG. 15 is a diagram illustrating an error table. Meanwhile, FIG. 16 is a diagram illustrating an error factor table. Meanwhile, FIG. 17 is a diagram illustrating an illumination intensity table. Meanwhile, FIG. 18 is a diagram illustrating an external light error rate table.

As illustrated in FIG. 13, the biometric authentication apparatus 1 according to the embodiment 2 has functionally an extractor 101a, a comparator 102a (comparing unit), notificator 103a, a wide area comparator 104a (high accuracy comparing unit), a log manager 105a (comparison result storage unit), a partial comparator 106 (high accuracy comparing unit), an analyzer 107. The extractor 101a causes the camera 14 to capture a face image, and extracts authentication data from the face image. In addition, the extractor 101a adjust the illumination intensity by the illuminator 13 based on an illumination intensity adjustment table in capturing the image. The comparator 102a refers to the registered template table, performs the identity check by comparing the registered template with the authentication data, and based on its result, updates the error table. The error table records, as illustrated in FIG. 15, the combination of the ID and the period of time and the number of times of comparing and the number of errors. The notificator 103a sends notification of an instruction for opening a door to the door control apparatus 2 only when the identity check by the comparator 102a is successful. The wide area comparator 104a performs the wide area comparison described above, to the authentication with which the identify check by the comparator 102a failed. The partial comparator 106 performs partial comparison described later, to the authentication with which the identify check by the comparator 102a failed. The log manager 105a records the comparison result by the wide area comparator 104a in the wide area comparison log table, and records the comparison result by the partial comparator 106 in the partial comparison log table. In the partial comparison log table, as illustrated in FIG. 14, the log number (No), the ID, the authentication execution time, the comparison result, the comparison block, and the external light direction are associated with each other and recorded. Meanwhile, the comparison block and the external light direction are described later. The analyzer 107 performs analysis based on at least one of the error table, the wide area comparison log table, and the partial comparison log table, and updates the illumination intensity adjustment table, the error factor table, and the external light error rate table. In the error factor table, as illustrated in FIG. 16, the ID and the period of time, and each of the numbers of times of factors of the authentication are associated with each other and recorded. Meanwhile, in the illumination intensity adjustment table, the period of time and the illumination intensity of the illuminator 13 are associated with each other and recorded. The illumination intensity is indicated by the duty ratio of the PWM (Pulse Width Modulation), for example. Meanwhile, in the external light error rate table, as illustrated in FIG. 18, the period of time, the number of external light errors, the total number of matching, the error rate due to external light and the external light direction are associated with each other and recorded. The error rate due to external light represents the ratio of the number of errors due to external light to the total number of times of comparing by all users who perform authentication in the corresponding period of time. Meanwhile, the external direction represents the average value of all the external light directions calculated by the partial comparison of the error authentication data in the corresponding period of time.

Figure 19:
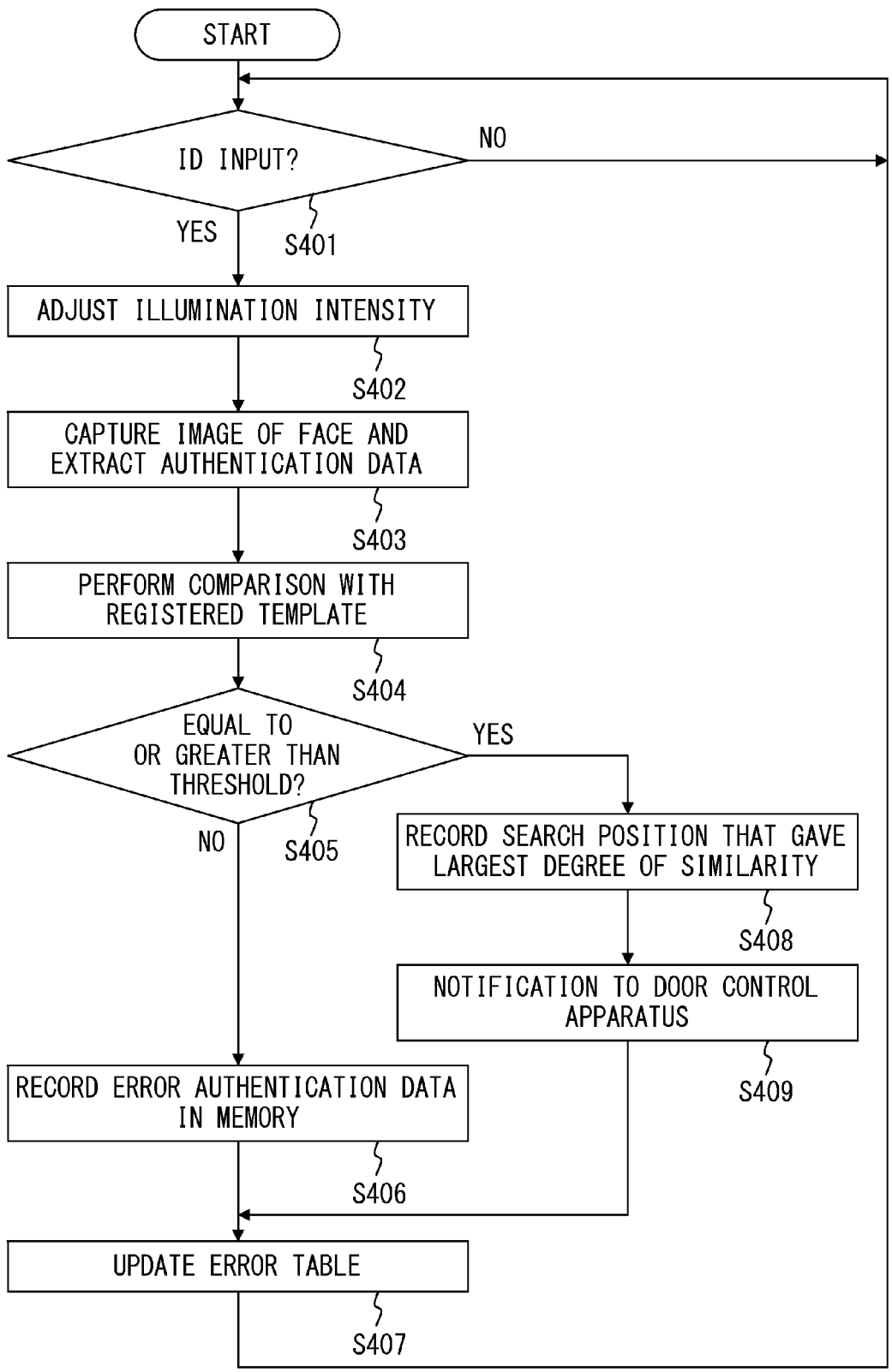
FIG. 19 is a diagram illustrating operations of an authentication process in embodiment 2.

Next, the authentication process in the embodiment 2 is explained. FIG. 19 is a diagram illustrating operations of an authentication process in the embodiment 2.

As illustrated in FIG. 19, first, the extractor 101a determines whether an ID has been input to the inputter 15 (S401).

When an ID has been input to the inputter 15 (S401, YES), the extractor 101a causes the illuminator 13 to adjust the illumination intensity to that corresponding to the current period of time in the illumination intensity adjustment table (S402). Next, the extractor 101a causes the camera 14 to capture a face image, and extracts an authentication data from the captured image (S403). Next, the comparator 102a performs comparing the registered template corresponding to the input ID in the registered template table and the authentication data (S404), and determines whether the degree of similarity is equal to or greater then a threshold (S405). Here, the comparator 102a refers to the search position table in a similar manner to the comparator 102 in the embodiment 1.

When the degree of similarity is less than the threshold (S405, NO), the comparator 102a records the authentication data as error authentication data in the memory 11 (S406), and updates the error table (S407). In this case, the comparator 102a increments the total number of comparisons and the number of errors corresponding to the ID. After the update of the error table, the extractor 101a determines whether an ID has been input to the inputter 15 again (S401).

On the other hand, when the degree of similarity is equal to or greater than the threshold (S405, YES), the comparator 102a records the search position that gave the largest degree of similarity in the search position table (S408). In addition, the notificator 103a sends a notification of an instruction for opening a door to the comparator 102a (S409). In this case, the comparator 102a increments only the total number of comparisons corresponding to the ID. After the update of the error table, the extractor 101a determines whether an ID has been input to the inputter 15 again (S401).

Figure 20:
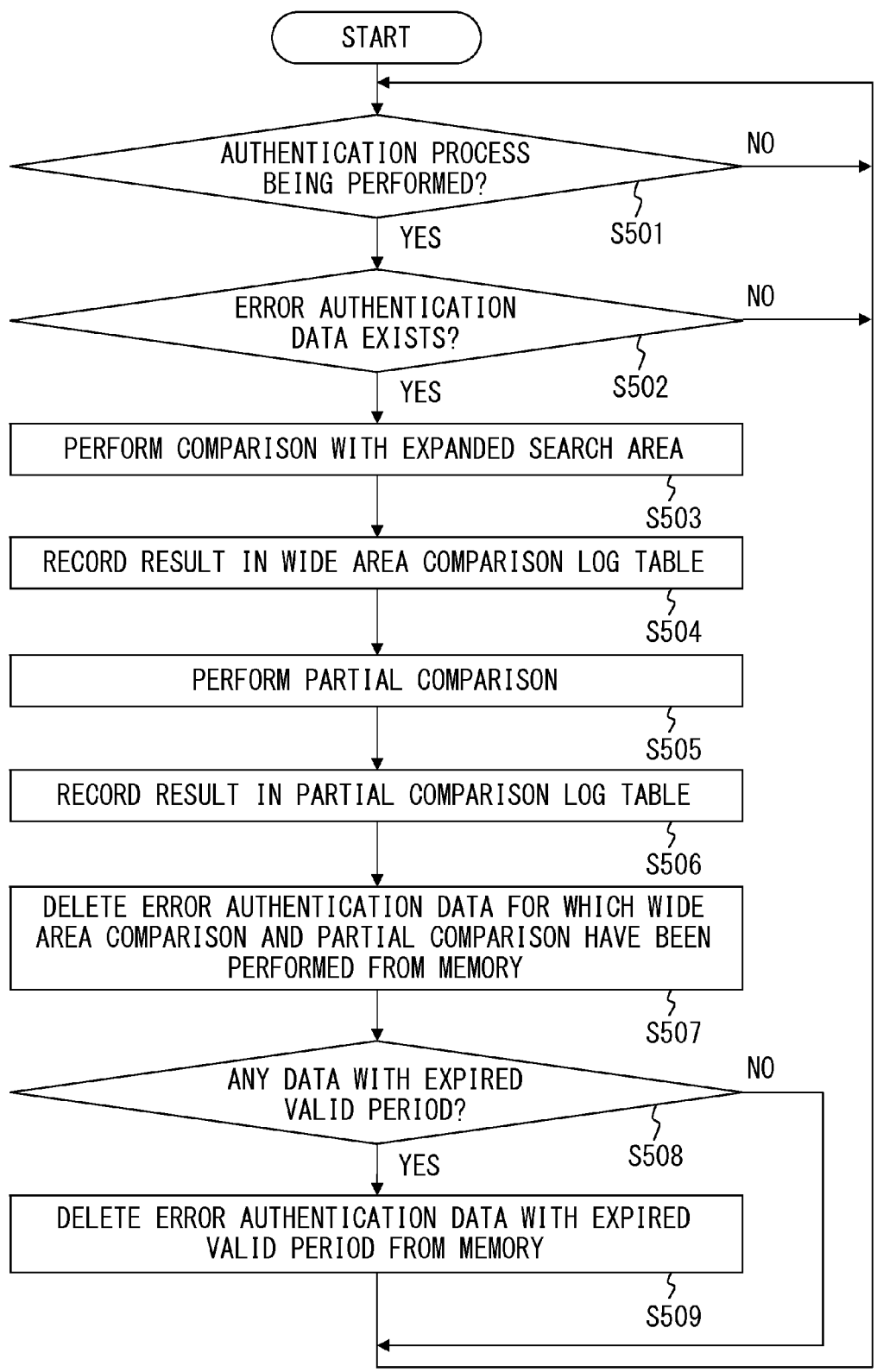
FIG. 20 is a flowchart illustrating operations of a high accuracy comparison process.

Next, operations of a high accuracy comparison process is explained. The high accuracy comparison process is a process to perform partial comparison in addition to the wide area comparison explained in the embodiment 1. FIG. 20 is a flowchart illustrating the operations of a high accuracy comparison process.

Figure 23:
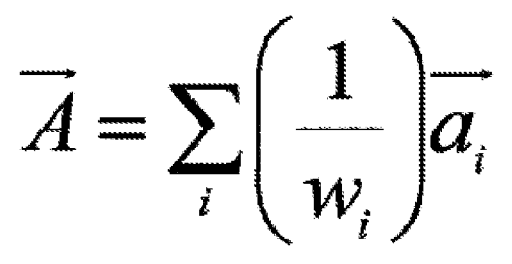
Figure 25:
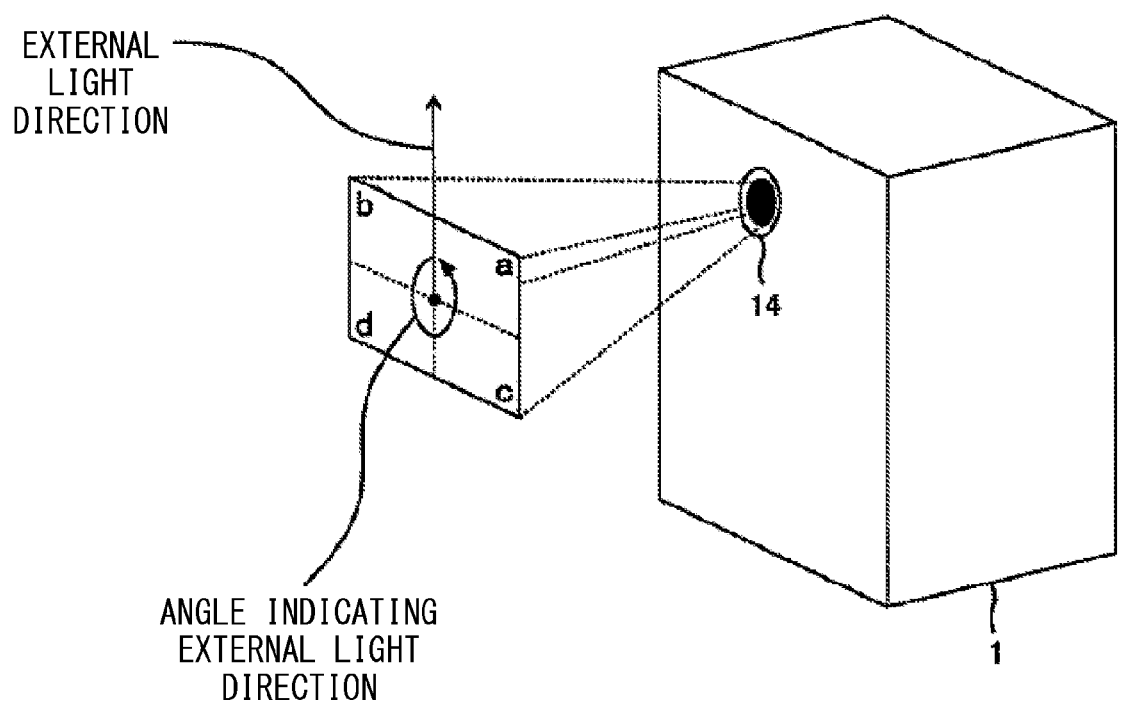
FIG. 25 is a diagram illustrating the angle of the external light direction.

FIG. 21 is a diagram illustrating blocks divided in the partial comparison. Meanwhile, FIG. 22 is a diagram illustrating an effect of the partial comparison. Meanwhile, FIG. 23 is a diagram illustrating the formula to obtain the external light direction. Meanwhile, FIG. 24 is a diagram schematically illustrating the way to obtain the external light direction. Meanwhile, FIG. 25 is a diagram illustrating the angle of the external light direction.

As illustrated in FIG. 20, first, the wide area comparator 104a determines whether the authentication process is being performed (S501).

When the authentication process is not being performed (S501, NO), the wide area comparator 104a determines whether error authentication data exists in the memory 11 (S502).

When error authentication data exists in the memory (S502, YES), the wide area comparator 104a conducts the comparison while enlarging the search area beyond that in the comparison in the authentication process (S503). After the execution of the wide area comparison, the log manager 105a records the result of the wide area comparison over an expanded search area in the wide area comparison log table with the posture mismatch (S504).

Next, the partial comparator 106 executes partial comparison on the error authentication data (S505). Here, the partial comparison is explained. In the partial comparison, as illustrated in FIG. 21, the authentication data is divided into a plurality of blocks, and comparison with the registered template is performed for each of the blocks. In the embodiment 2, it is assumed that the authentication data is divided into four blocks of a, b, c, d. By this partial comparison, as illustrated in FIG. 22. even for authentication data that lacks an appropriate image for authentication of a certain area due to external light and the like, the comparison can be performed with blocks without the lack.

In this partial comparison, the partial comparator 106 estimates the external light direction representing the incident direction of external light in a captured image. The external light direction is a direction with respect to the center of the error authentication data at a position at which the degree of similarity is lowest in the authentication data. Assuming the external direction to be obtained as vector A, the number of divided blocks as i, the vector from the center of the error authentication data to the block i as vector ai, and the degree of similarity of each block as Wi, the vector A representing the external direction is obtained by the formula presented in FIG. 23. According to this formula, as illustrated in FIG. 24, based on the weight indicated by the thickness of the arrow from the center of the error authentication data to the center of each block, the external light direction is obtained. Here, the weight is a value represented by the reciprocal of the degree of similarity for each block. In FIG. 24, the light-dark tone for each block represents the degree of similarity, and the darker block means the lower the degree of similarity and the lighter block means the higher the degree of similarity. The external light direction estimated as described above is supposed to be expressed by the clockwise angle with respect to the center of the error authentication data as illustrated in FIG. 25. In addition, the partial comparator 106 calculates the average luminance of the block with the lowest degree of similarity in the partial comparison and records the value in non-volatile memory 12 while associating it with the time zone in which the comparison is performed.

After the execution of the partial comparison, the log manager 105a records the result of the wide area comparison with an expanded search area in the wide area comparison log table with the posture mismatch (S504). Here, when there is a block with a degree of similarity equal to or greater than the threshold in the partial comparison, the block with a degree of similarity equal to or greater than the threshold and the external light direction estimated in the method described above are associated with the ID and recorded in the search position table.

Next, the log manager 105a deletes the error authentication data for which the wide area comparison and the partial comparison have been performed from the memory 11 (S507), and determines whether error authentication data whose valid period has expired exists in the memory 11 (S508).

When error authentication data whose valid period has expired exists in the memory 11 (S508, YES), the log manager 105a deletes the error authentication data whose valid period has expired from the memory 11 (S509). Next, the wide area comparator 104a determines whether the authentication process is being performed again (S501).

On the other hand, when error authentication data whose valid period has expired does not exist in the memory 11 (S508, NO), the wide area comparator 104a determines whether the authentication process is being performed again (S501).

Meanwhile, when there is no error authentication data in the memory 11 in step S502 (S502, NO), the wide area comparator 104a determines whether the authentication process is being performed again (S501).

Meanwhile, when the authentication process is being performed in step S501 (S501, YES), the wide area comparator 104a determines whether the authentication process is being performed again (S501).

Thus, the biometric authentication apparatus 1 according to the embodiment 2 performs the partial area comparison on the error authentication data, and records its result and the external light direction as a log. Accordingly, the administrator of the biometric authentication apparatus 1 may investigates the cause of occurrence of the authentication error without leaving authentication data having an issue in terms of security or privacy beyond the valid period. In addition, by performing the wide area comparison and the partial comparison to the same error authentication data, the administrator may identify the cause of the occurrence of the authentication error from the group of posture mismatch, external light, and both of posture mismatch and external light.

Figure 26:
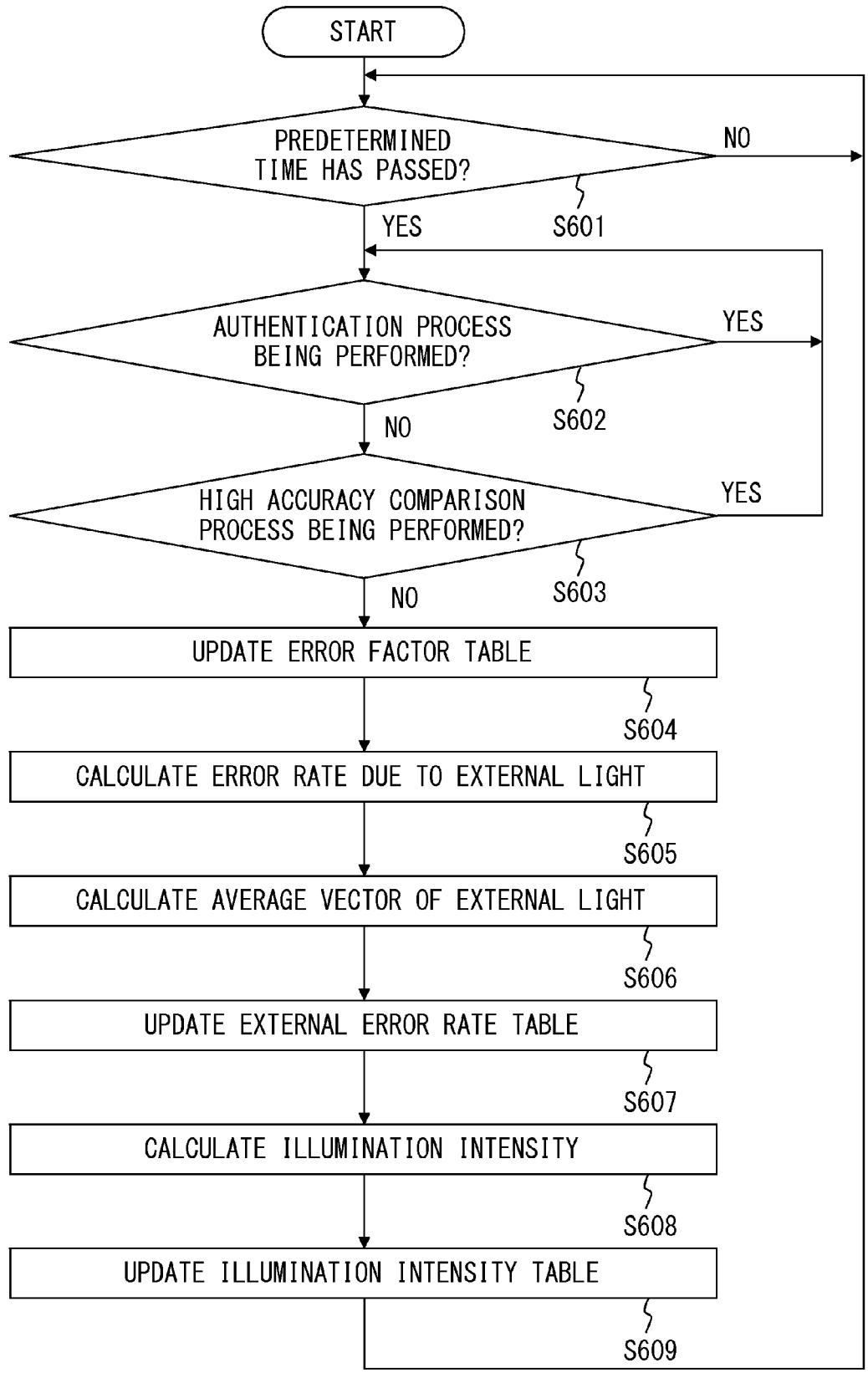
FIG. 26 is a diagram illustrating operations of an analysis process.
Figure 27:
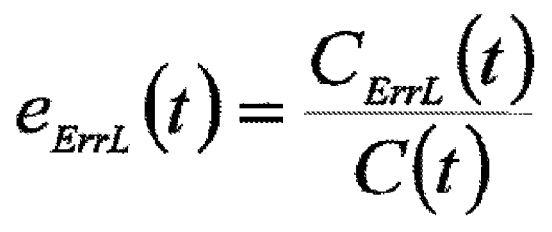

Next, operations of an analysis process is explained. The analysis process is a process to perform analysis based on the result of the wide area comparison and the partial comparison. FIG. 26 is a diagram illustrating the operations of the analysis process. Meanwhile, FIG. 27 is a diagram illustrating the formula to calculate an error rate due to external light. Meanwhile, FIG. 28 is a diagram illustrating the formula to calculate the average vector of the external light directions.

As illustrated in FIG. 26, first, the analyzer 107 determines whether a predetermined time set in advance has elapsed (S601).

When the predetermined time has elapsed (S601, YES), the analyzer 107 determines whether the authentication process is being executed (S602).

When the authentication process is not being executed (S602, NO), the analyzer 107 determines whether the high accuracy comparison process is being processed (S603).

When the high accuracy comparison process is not being executed (S603, NO), the analyzer 107 updates the error factor table, based on the error table, the wide area comparison table and the partial comparison log table (S604).

Next, the analyzer 107 calculates the error rate due to external light for each period of time, based on the error factor table (S605). The error rate due to external light is obtained by the formula presented in FIG. 27 assuming the period of time as t, the error rate due to external light in the period of time t as $e_{ErrL}$ (t), the total number of comparison in the period of time t as C(t), the number of errors due to external light in the period of time t as $C_{ErrL}(t)$. There, t is assumed as a variable that represents 00:00~23:00 by values 0~23.

Next, the analyzer 107 calculates the average vector of the external directions based on the partial comparison log table (S606). The average vector is obtained by the formula presented in FIG. 28, assuming the period of time as t, the average vector in the period of time t as vector <A>, the variable representing each external light error in the period of time t as i, the vector in the external error i as vector Ai, the number of errors due to external light in the period of time t as $C_{ErrL}(t)$. After calculating the average vector, the analyzer 107 updates the external light error rate table based on these calculated values (S607).

Next, the analyzer 107 calculates the illumination intensity, based on the average luminance value associated with the ID of the user whose number of external light error is equal to or greater than a predetermined number in the error factor table and that is not recorded in the illumination intensity table (S608). The average luminance value is the value calculated by the partial comparator 106 in the partial comparison described above. Here, the analyzer 107 calculates the illumination intensity, based on the correspondence relationship between the average luminance value and the appropriate illumination intensity. The correspondence relationship is supposed to have been obtained in advance by capturing the image of a face such that external light is included in a predetermined block i and adjusting the illumination intensity of the illuminator 13 so that the average illumination value of the block i in the authentication data based on the face image becomes a suitable value. After the calculation of the illumination intensity, the analyzer 107 updates the illumination intensity table of the period of time associated with the average illumination value (S609). After the update, the analyzer 107 determines whether the predetermined time has elapsed again (S601).

Meanwhile, in step S603, when the high accuracy comparison is being performed (S603, YES), the analyzer 107 determines whether the authentication process is being performed again (S602).

Meanwhile, in step S602, when the authentication process is being executed (S602, YES), the analyzer 107 whether the predetermined time has elapsed again (S601).

In addition, in step S601, when the predetermined time does not have elapsed (S601, NO), the analyzer 107 determines whether the predetermined time has elapsed again (S601).

Thus, with the, biometric authentication apparatus 1 performing analysis based on the error table, wide area comparison log table, partial comparison log table, the burden on the administrator of the biometric authentication apparatus 1 may be reduced. For example, with the biometric authentication apparatus 1 sending a notification mail to the administrator via a network, the administrator does not need to regularly monitor the log data of the biometric authentication apparatus 1.

Figure 29:
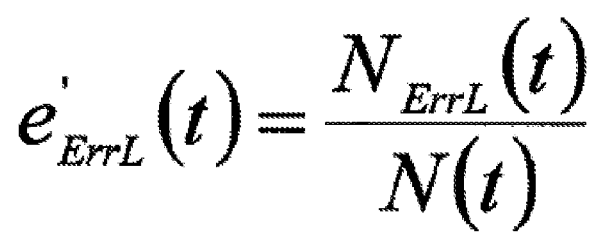

Meanwhile, while the external light error rate is calculated for each period of time in the analysis process described above, the analyzer 107 may calculate the rate of users for whom an error due to external light occurs in a certain period of time (external light error generating user rate). FIG. 29 is a diagram illustrating the formula to calculate an external light error generating user rate. The number of external light error generating users is calculated by the formula presented in FIG. 29 assuming the period of time as t, the rate of users for whom an error due to external light occurs in the period of time t as $e'_{ErrL}$ (t), the number of users for whom the comparison is performed in the period of time t as N(t), the number of users for whom an error due to external light occurs in the period of time t $N_{ErrL}$ (t). The external light error generating user rate is especially effective in a case such as when a particular user generates a number of errors and increases the overall external light error rate. For example, when the external light error generating user rate corresponding to the period of time over which the external error rate is high is high, the administrator may predict that the external light errors are occurring not just for a particular user. That is, by referring to the external light error generating user rate, the administrator may determine the degree of reliability of the external light error rate.

Meanwhile, the analyzer 107 may create a history table representing the external light error rate focusing on a specific period of time t. FIG. 30 is a diagram illustrating a history table. As illustrated in FIG. 30, the history table associates and records the date, the number of external errors per day, the total number of matching per day, the error rate due to external light per day, and the average of the external light directions per day. In addition, the history table is created for each period of time. The analyzer 107 updates the history table of the period of time in which the comparison is performed, for every comparison. In addition, when displaying the external light error rate table and the history table, the history table for each period of time is supposed to be linked to the corresponding period of time in the external light error rat table. By creating a history table as described above, the administrator may know the change in the external light error rate, and accordingly, may predict that the environment around the biometric authentication apparatus 1 has changed.

In addition, the analyzer 107 may calculate the error rate due to posture mismatch for each user. FIG. 31 is a diagram illustrating an error rate due to posture mismatch. Meanwhile, FIG. 32 is a diagram illustrating the change in the error rate due to external light. The error rate due to the posture mismatch is calculated by the formula presented in FIG. 31 assuming the period of time as t, the error rate due to the posture mismatch for a particular user as $e_A$, the total number of comparison for the particular user in the period of time t as C(t), the total number of errors due to the posture of the particular user as $C_{ErrA}(t)$. By calculating the error rate due to the posture mismatch for each user, the user with less errors due to the posture mismatch may be extracted. Since the error due to the posture mismatch is an error that is ascribed to a specific user, by calculating the error rate due to external light only for the user with a low error rate due to the posture mismatch, the influence of the error due to the posture mismatch may be reduced. The analyzer 107 may calculate the error rate due to external light for top 5% users with a low error rate due to the posture mismatch. By plotting the error rate due to external light obtained as described above, the administrator may obtain the change in the external light error rate illustrated in FIG. 32. In FIG. 32, the vertical axis represents the error rate due to external light, and the horizontal axis represents the time. With the change in the external light error rate, the administrator may predict the period of time over which external light affects the comparison more accurately.

Figure 33:
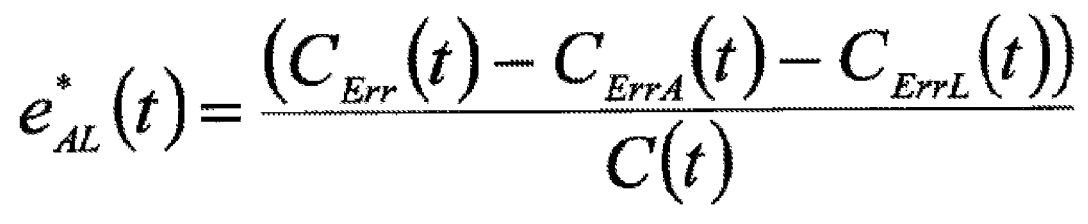

In addition, the analyzer 107 may calculate the error rate (factor unknown error rate) due to a factor other than external light and posture mismatch. FIG. 33 is a diagram illustrating the formula for calculating a factor unknown error rate. The factor unknown error rate $e^*_{AL}(t)$ in the period of time t is calculated by the formula presented in FIG. 33 assuming the period of time as t, the total number of comparisons during the time t as C(t). the total number of errors in the period of time (t) as CErr(t), the total number of errors due to the posture mismatch in the period of time t as $C_{ErrA}(t)$, and the total number of errors due to external light as $C_{ErrL}(t)$. When the factor unknown error rate is equal to or greater than 0, the biometric authentication apparatus 1 sends a notification to the administrator by mail with a higher priority than that for errors due to other factors. Accordingly, the administrator may cope with an error with an unknown cause promptly.

As described above, by performing comparison such as the wide area comparison and the partial comparison with a higher accuracy than the normal comparison and recording their results, the administrator may estimate the cause of an error without saving the error authentication data. In addition, the two embodiments described above may be combined and implemented.

The processes for the biometric authentication apparatus 1 described above may be executable in a computer system illustrated below by connecting devices for biometric authentication. FIG. 34 is a diagram illustrating an example of a computer system. The computer system 900 illustrated in FIG. 34 has a main unit 901 including built-in CPU, disc drive and the like, a display 902 that displays an image in response to an instruction from the main unit 901, a keyboard 903 for inputting various information to the computer system 900, a mouse 904 that specifies an arbitrary position on a display screen 902a on the display 902, and a communication apparatus 905 that accesses an external database and the like and downloads a program and the like stored in another computer system. As the communication apparatus 905, a network communication card, modem (modulator-demodulator) are available.

A program for causing the computer system as described above to execute each step described above may be provided as a biometric authentication program. The program can be stored in a recording medium readable by the computer system to be executed by the computer system constituting a biometric authentication apparatus. The program processing each step described above may be stored in a portable recording medium such as a disc 910 and the like, or may be downloaded from a recording medium 906 of another computer system by the communication apparatus 905. Meanwhile, the biometric authentication program that realizes at least the biometric authentication function in the computer system 900 is loaded into and compiled by the computer system 900. The program causes the computer system 900 to operate as a biometric authentication apparatus having a biometric authentication function. In addition, this program may be stored in a computer readable recording medium such as the disc 910. Here, the recording medium readable by the computer system 900 includes an internal storage apparatus implemented inside the computer such as ROM and RAM, a portable recording medium such as the disc 910, a flexible disc, DVD disc, magnet-optical disc, IC card and the like, a database that holds a computer program, or, another computer or its data base, and various recording media accessible by a computer system connected via communication means such as the communication apparatus 905.

The invention may be embodied in other specific forms without departing from the spirit or essential characteristics thereof. The present embodiment is therefore to be considered in all respects as an illustrative and not restrictive one. The scope of the invention is indicated by the appended claims rather than by the foregoing description. Further all modifications, various improvements, replacements, and changes which come within the meaning and range of equivalency of the claims are therefore intended to be embraced therein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

DESCRIPTION OF NUMERALS 1 biometric authentication apparatus, 2 door control apparatus, 10 CPU, 11 memory, 12 non-volatile memory, 13 illuminator, 14 camera, 15 inputter, 16 display, 17 external IF, 101,101a extractor, 102,102a comparator, 103, 103a notificator, 104,104a wide area comparator, 105, 105a log manager, 106 partial comparator, 107 analyzer

What is claimed is:
1. A biometric authentication apparatus comprising:
a comparator that performs authentication of a user by comparing biological information over searchable areas comprising searchable positions read from the user's hand with registered biological information registered in a storage in advance;
a high accuracy comparator that compares the biological information with the registered biological information with a higher accuracy instead of comparison using the comparator when the user is not authenticated by the comparator; and
a comparison result storage that records a comparison result obtained by the high accuracy comparator in the storage, wherein
the comparator generates and records an error authentication data in the storage, when the user is not authenticated by the comparator; the error authentication data comprising a search area indicating an area searched by the comparator and a search position of the biological information at which the degree of similarity becomes largest;
the high accuracy comparator compares the biological information and the registered biological information by performing a wide area comparison of an increased search area beyond the search area of the comparator based on the error authentication data, and
the high accuracy comparator records in the storage a moved position of the search position at which a degree of similarity in the wide area comparison is largest, the moved position being moved with respect to a reference position of the biological information corresponding to the user, and the comparator determines whether an average of a plurality of moved positions corresponding to the registered biological information of the user stored in the storage over a plurality of authentication occurrences is at least equal to a predetermined value and a standard deviation of the plurality of moved positions is less than a predetermined value, the comparator causes a display of the biometric authentication apparatus to output information to instruct the user to move the user's hand to an opposite direction opposite to a direction of movement of the plurality of moved positions.

2. The biometric authentication apparatus according to claim 1, wherein the high accuracy comparator further divides the increased search area into a plurality of parts, and calculates a distance from the search position, which the degree of similarity performed by the comparator, to the center of each parts of the plurality parts.

3. The biometric authentication apparatus according to claim 2, wherein the high accuracy comparator expands a search area while giving a higher priority to a part with corresponding distance is smaller.

4. The biometric authentication apparatus according to claim 1, wherein the high accuracy comparator excludes, in performing the wide area comparison, the search area for which comparison has been performed by the comparator.

5. The biometric authentication apparatus according to claim 1, wherein
the high accuracy comparator performs the wide area comparison giving a higher priority to an area closer to the search position recorded in the storage by the comparator.

6. A non-transitory computer-readable recording medium having stored therein a program for causing a computer to execute a digital signature process comprising:
performing, using a comparison, by comparing biological information over searchable areas comprising searchable positions read from a user's hand and registered biological information registered in a storage in advance, authentication of the user; and
when the user is not authenticated, comparing, using a high accuracy comparison, the biological information and the registered biological information with a higher accuracy than the comparison; and
recording a comparison result by the high accuracy comparison in the storage, wherein
in the comparison, an error authentication data is generated and recorded in the storage when the user is not authenticated; the error authentication data comprising a search area indicating an area searched by the comparison and a search position of the biological information at which the degree of similarity becomes largest;
in the high accuracy comparison, the biological information and the registered biological information are compared by a wide area comparison of an increased search area beyond the search area of the comparison based on the error authentication data, and
in the high accuracy comparison, a moved position of the search position at which a degree of similarity in the wide area comparison is largest is recorded in the storage, the moved position being moved with respect to a reference position of the biological information corresponding to the user, and
in the comparison, an average of a plurality of moved positions corresponding to the registered biological information of the user stored in the storage over a plurality of authentication occurrences is at least equal to a predetermined value and a standard deviation of the plurality of moved positions is less than a predetermined value, the comparison causes a display in communication with the computer to output information to instruct the user to move the user's hand to an opposite direction opposite to a direction of movement of the plurality of moved positions.

7. The non-transitory computer-readable recording medium according to claim 6, wherein
in the high accuracy comparison, further, the increased search area is divided into a plurality of parts, and a distance from the search position, which the degree of similarity performed by the comparison, to the center of each parts of the plurality parts is calculated.

8. The non-transitory computer-readable recording medium according to claim 7, wherein in the high accuracy comparison, a search area is expanded while giving a higher priority to a part with corresponding distance is smaller.

9. A biometric authentication method using a biometric authentication apparatus, comprising:
performing authentication of a user by comparing biological information over searchable areas comprising searchable positions read from the user's hand with registered biological information registered in a storage in advance using a comparator;
comparing the biological information with the registered biological information using a high accuracy comparator with a higher accuracy instead of comparison using the comparator when the user is not authenticated by the comparator; and
recording a comparison result obtained by the high accuracy comparator in the storage, wherein
the comparator generates and records an error authentication data in the storage, when the user is not authenticated by the comparator; the error authentication data comprising a search area indicating an area searched by the comparator and a search position of the biological information at which the degree of similarity becomes largest;
the high accuracy comparator compares the biological information and the registered biological information by performing a wide area comparison of an increased search area beyond the search area of the comparator based on the error authentication data, and
the high accuracy comparator records in the storage a moved position of the search position at which a degree of similarity in the wide area comparison is largest, the moved position being moved with respect to a reference position of the biological information corresponding to the user, and
the comparator determines whether an average of a plurality of moved positions corresponding to the registered biological information of the user stored in the storage over a plurality of authentication occurrences is at least equal to a predetermined value and a standard deviation of the plurality of moved positions is less than a predetermined value, the comparator causes a display of the biometric authentication apparatus to output information to instruct the user to move to an opposite direction opposite to a direction of movement of the plurality of moved positions.

10. The biometric authentication method according to claim 9, wherein the high accuracy comparator, further, divides the increased search area into a plurality of parts and calculates a distance from the search position, which the degree of similarity performed by the comparator, to the center of each parts of the plurality parts; wherein the high accuracy comparator expands a search area while giving a high priority to a part with corresponding distance is smaller.

* * * * *

UNITED STATES PATENT AND TRADEMARK OFFICE
CERTIFICATE OF CORRECTION

| | |
|---|---|
| PATENT NO. | : 9,013,271 B2 |
| APPLICATION NO. | : 13/601326 |
| DATED | : April 21, 2015 |
| INVENTOR(S) | : Takahiro Aoki |

It is certified that error appears in the above-identified patent and that said Letters Patent is hereby corrected as shown below:

In the Claims

Column 16, Line 16, In Claim 7, after "plurality" insert -- of --.

Signed and Sealed this
Twenty-ninth Day of September, 2015

Michelle K. Lee
*Director of the United States Patent and Trademark Office*